United States Patent
Jean et al.

(10) Patent No.: US 10,360,695 B1
(45) Date of Patent: Jul. 23, 2019

(54) METHOD AND AN APPARATUS FOR ENABLING ULTRA-LOW LATENCY COMPRESSION OF A STREAM OF PICTURES

(71) Applicant: MATROX GRAPHICS INC., Dorval (CA)

(72) Inventors: Nicolas Jean, Dorval (CA); Alain Champenois, Montreal (CA); Jean-Jacques Ostiguy, Dorval (CA); Mathieu Girard, Dorval (CA); Khalil Mawassi, Dorval (CA)

(73) Assignee: MATROX GRAPHICS INC., Dorval Quebec (CA)

( * ) Notice: Subject to any disclaimer, the term of this patent is extended or adjusted under 35 U.S.C. 154(b) by 108 days.

(21) Appl. No.: 15/611,558

(22) Filed: Jun. 1, 2017

(51) Int. Cl.
| | |
|---|---|
| G06T 9/00 | (2006.01) |
| H04N 19/10 | (2014.01) |
| H04N 19/94 | (2014.01) |
| H04N 19/124 | (2014.01) |
| H04N 19/176 | (2014.01) |

(52) U.S. Cl.
CPC ........... *G06T 9/008* (2013.01); *H04N 19/124* (2014.11); *H04N 19/94* (2014.11); *G06T 9/005* (2013.01); *H04N 19/10* (2014.11); *H04N 19/176* (2014.11)

(58) Field of Classification Search
CPC ....... G06T 9/008; G06T 9/005; H04N 19/124; H04N 19/94; H04N 19/10; H04N 19/176
See application file for complete search history.

(56) References Cited

U.S. PATENT DOCUMENTS

| | | |
|---|---|---|
| 6,256,423 B1 | 7/2001 | Krishnamurthy et al. |
| 6,864,909 B1 | 3/2005 | Horowitz |
| 6,895,048 B2 | 5/2005 | Boice et al. |
| 7,085,322 B2 | 8/2006 | Ngai et al. |
| 7,403,562 B2 | 7/2008 | Yang et al. |
| 7,680,182 B2 | 3/2010 | Toma et al. |
| 7,869,661 B2 | 1/2011 | Uchibayashi et al. |

(Continued)

OTHER PUBLICATIONS

Aboalmaaly M. F., et al., "Data-Level Parallel Approaches for the H.264 Coding: A Review," First International Engineering Conference (IEC2014), Nov. 2014, pp. 221-228.

(Continued)

*Primary Examiner* — Mia M Thomas
(74) *Attorney, Agent, or Firm* — Nicholson De Vos Webster & Elliott LLP

(57) ABSTRACT

A method and apparatus for enabling low latency compression of a stream of pictures are described. A first set of static regions of a current picture from the plurality of pictures is determined, where each region from the first set is static. A second set of regions of the current picture is determined, where the second set includes all regions of the current picture that are not included in the first set. Compression of the first set of regions is performed based on values of a first quantization parameter determined by a MAQ mechanism. The MAQ mechanism is operative to dynamically increase the compression quality of static regions. Compression of the second set of regions is performed based on values of a second quantization parameter determined by a rate control mechanism. The rate control mechanism is operative to compress the data stream according to a target bit rate.

39 Claims, 13 Drawing Sheets

(56) References Cited

U.S. PATENT DOCUMENTS

| | | | |
|---|---|---|---|
| 8,000,393 B2 | 8/2011 | Tanaka | |
| 8,086,052 B2 | 12/2011 | Toth et al. | |
| 8,780,973 B2 | 7/2014 | Srinivasamurthy et al. | |
| 9,047,669 B1 | 6/2015 | Ostiguy et al. | |
| 9,215,413 B2* | 12/2015 | Bright-Thomas | H04N 19/30 |
| 9,326,006 B2* | 4/2016 | Chiang | H04N 19/139 |
| 9,621,900 B1 | 4/2017 | Ostiguy et al. | |
| 2004/0028143 A1 | 2/2004 | Schoenblum | |
| 2005/0105815 A1* | 5/2005 | Zhang | H04N 19/197 382/251 |
| 2005/0254577 A1 | 11/2005 | Ando | |
| 2006/0095401 A1* | 5/2006 | Krikorian | H04N 21/4398 |
| 2007/0005804 A1* | 1/2007 | Rideout | H04L 12/1822 709/246 |
| 2007/0081589 A1 | 4/2007 | Kim et al. | |
| 2008/0165852 A1 | 7/2008 | Zhang | |
| 2009/0190850 A1* | 7/2009 | Tang | G01V 11/00 382/251 |
| 2009/0213930 A1 | 8/2009 | Ye et al. | |
| 2009/0296808 A1 | 12/2009 | Regunathan et al. | |
| 2010/0135397 A1 | 6/2010 | Tanaka | |
| 2011/0249728 A1 | 10/2011 | Bock et al. | |
| 2012/0124300 A1* | 5/2012 | Teyssier | G06F 13/16 711/154 |
| 2012/0140816 A1 | 6/2012 | Franche et al. | |
| 2012/0183039 A1 | 7/2012 | Rajamani et al. | |
| 2012/0250758 A1* | 10/2012 | Jou | H04N 19/13 375/240.03 |
| 2013/0107947 A1* | 5/2013 | Lee | H04N 19/172 375/240.05 |
| 2014/0153644 A1 | 6/2014 | Dzik | |
| 2014/0267560 A1* | 9/2014 | Bright-Thomas | H04N 7/152 348/14.08 |
| 2015/0082345 A1* | 3/2015 | Archer | H04L 65/605 725/34 |
| 2015/0382017 A1* | 12/2015 | Tanner | H04N 19/139 375/240.12 |
| 2017/0251204 A1* | 8/2017 | Gupte | H04N 13/178 |
| 2017/0374375 A1* | 12/2017 | Makar | H04N 19/126 |
| 2018/0288356 A1* | 10/2018 | Ray | H04N 19/176 |

OTHER PUBLICATIONS

Bhattacharyya S., et al., "Burstiness Minimized Rate Control for High Resolution H.264 Video Conferencing," IEEE, 2014, 6 pages.

Bhattacharyya S., et al., "Burstiness Minimized Rate Control for High Resolution H.264 Video Conferencing," IEEE Abstract, Communications (NCC), 2014 Twentieth National Conference on Feb. 28, 2014-Mar. 2, 2014, IEEE, [retrieved on Aug. 4, 2015] Retrieved from the Internet: <http://ieeexplore.ieee.org/xpl/login.jsptp=&arnumber=6811332&url=http> 2 pages.

Gu, Junli, et al., "Optimizing a Parallel Video Encoder with Message Passing and a Shared Memory Architecture," Tsinghua Science and Technology, vol. 16, No. 4, Aug. 2011, pp. 393-398.

Meenderinck C., et al., "Parallel Scalability of Video Decoders," Journal of Signal Processing Systems, 2008, 22 pages.

Sharma H., "Comparative Performance of JM and FFMPEG Codecs of H.264 AVC Video Compression Standard," A Thesis Presented to the Faculty of San Diego State University, 2012, 73 pages.

Wang Y., et al., "Multi-Grain Parallel Accelerate System for H.264 Encoder on ULTRASPARC T2," Journal of Computers, Dec. 2013, vol. 8 (12), pp. 3293-3297.

Yoo K., et al., "Pipelining Architecture Design of the H.264/AVC HP@L4.2 Codec for HD Applications," Picture Coding Symposium 2007, Nov. 7-9, 2007, 4 pages.

Final Office Action for U.S. Appl. No. 13/670,587, dated May 18, 2016, 19 pages.

Non-Final Office Action for U.S. Appl. No. 13/670,587, dated Feb. 2, 2015, 16 pages.

Non-Final Office Action for U.S. Appl. No. 13/670,587, dated Nov. 16, 2015, 19 pages.

Final Office Action for U.S. Appl. No. 13/670,587, dated Jun. 8, 2015, 19 pages.

Tang, "Spatiotemporal Visual Considerations for Video Coding", IEEE Transactions on multimedia, vol. 9, No. 2, Feb. 2007, pp. 231-238.

Kwon et al., "Rate Control for H.264 Video With Enhanced Rate and Distortion Models", IEEE transactions on circuits for video technology, vol. 17, No. 5, May 2007, pp. 517-529.

Notice of Allowance for U.S. Appl. No. 13/670,587, dated Nov. 29, 2016, 9 pages.

\* cited by examiner

| Encoder CPB fullness average of the last 5 encoded pictures, just after picture additions (FE+) | Number of new regions that can be compressed based on MAQ (in % of total regions) |
|---|---|
| 60% | 10% (maximum) |
| 70% | 5% |
| 80% | 0% (minimum) |

FIGURE 7A

| Encoder CPB fullness average of the last 5 encoded pictures, just after picture additions (FE+) | Number of new regions that can be compressed based on MAQ (in % of total regions) |
|---|---|
| 60% | 10% (maximum) |
| In-between | Interpolation between max and min |
| 80% | 0% (minimum) |

FIGURE 7B

| Threshold (in QP value) | Number of new regions that can be compressed based on MAQ (in % of total regions) |
|---|---|
| 20 | 10% (maximum) |
| 30 | 5% |
| 40 | 0% (minimum) |

FIGURE 7C

| Threshold (in QP value) | Number of new regions that can be compressed based on MAQ (in % of total regions) |
|---|---|
| 20 | 10% (maximum) |
| In-between | Interpolation between max and min |
| 40 | 0% (minimum) |

FIGURE 7D

METHOD AND AN APPARATUS FOR ENABLING ULTRA-LOW LATENCY COMPRESSION OF A STREAM OF PICTURES

FIELD

Embodiments of the invention relate to the field of image data compression and decompression; and more specifically, to enabling low latency compression for remote desktop applications.

BACKGROUND

Applications that use image data are found in many different fields, such as security control, television, broadcasting, social media, video telephony, videoconferencing, wireless devices, streaming media applications, remote desktop, cloud computing, and others. Image data may refer to video data, computer generated graphics data, desktop data, or any other type of data depicting a visual perception. Image data may be stored in a variety of medium (DVDs, Blu-Ray disks, mobile devices, memory sticks, hard-drive, etc.) and may be transmitted through a variety of wired or wireless transmission media (also called a carrier) (e.g., electrical, optical, radio, acoustical or other form of propagated signals—such as carrier waves, infrared signals etc.).

Image compression and decompression are performed to reduce the consumption of expensive resources, such as storage space or transmission bandwidth. In general, a codec (encoder/decoder) includes an encoder used to convert the source image data into a compressed form occupying a reduced space prior to storage or transmission. The codec may also comprise a decoder which receives compressed data and converts it into a decompressed image or stream ready for display or for further processing. The codec may be implemented only in software executed on one or more general purpose processors, implemented only on dedicated hardware components, or a combination of software running on general purpose processors and dedicated hardware components. Compression efficiency of encoders is typically defined by the bit rate and the perceived image quality of the decompressed video stream. In the following description, compression quality or the quality of compression refer to "image quality of the decompressed video stream as perceived by a person viewing the decompressed video stream". In many applications, it is desirable to have a constant bit rate, maximum bit rate, or substantially constant bit rate while maintaining a good quality image. This can be particularly challenging for real time encoders that encode image data that has a high variability in content from picture to picture and/or within the same picture or when encoding/decoding pictures with high resolutions, high frame rate, or when low latency is desired.

Pictures of desktop data streams (which are referred to herein as desktop streams) present unique characteristics compared to pictures of other types of image data streams. For example, a typical picture from a desktop stream includes portions that remain static (e.g., the background and certain windows that are open on the desktop picture) while other portions of the desktop (e.g., a window displaying video) may be in motion. There can be long periods of user inactivity where the desktop pictures remain static followed by sudden peaks of user activity (e.g., when the user opens or moves a window) which put high demands on the system causing unacceptable latency.

Therefore, encoding a desktop image data stream poses unique challenges compared to encoding other types of image data streams.

BRIEF DESCRIPTION OF THE DRAWINGS

The invention may best be understood by referring to the following description and accompanying drawings that are used to illustrate embodiments of the invention. In the drawings:

FIG. 7A illustrates an exemplary table of correspondence between encoder CPB fullness average threshold and a maximum number of new regions that can be compressed based on MAQ, in accordance with some embodiments.

FIG. 7B illustrates an exemplary table of correspondence between the encoder CPB fullness average threshold and a maximum number of new regions that can be compressed based on MAQ, in accordance with some embodiments.

FIG. 7C illustrates an exemplary table of correspondence between second threshold and a maximum number of new regions that can be compressed based on MAQ when they first become static, in accordance with some embodiments.

FIG. 7D illustrates an exemplary table of correspondence between second threshold and a maximum number of new regions that can be compressed based on MAQ, in accordance with some embodiments.

DESCRIPTION OF EMBODIMENTS

Figure 1:
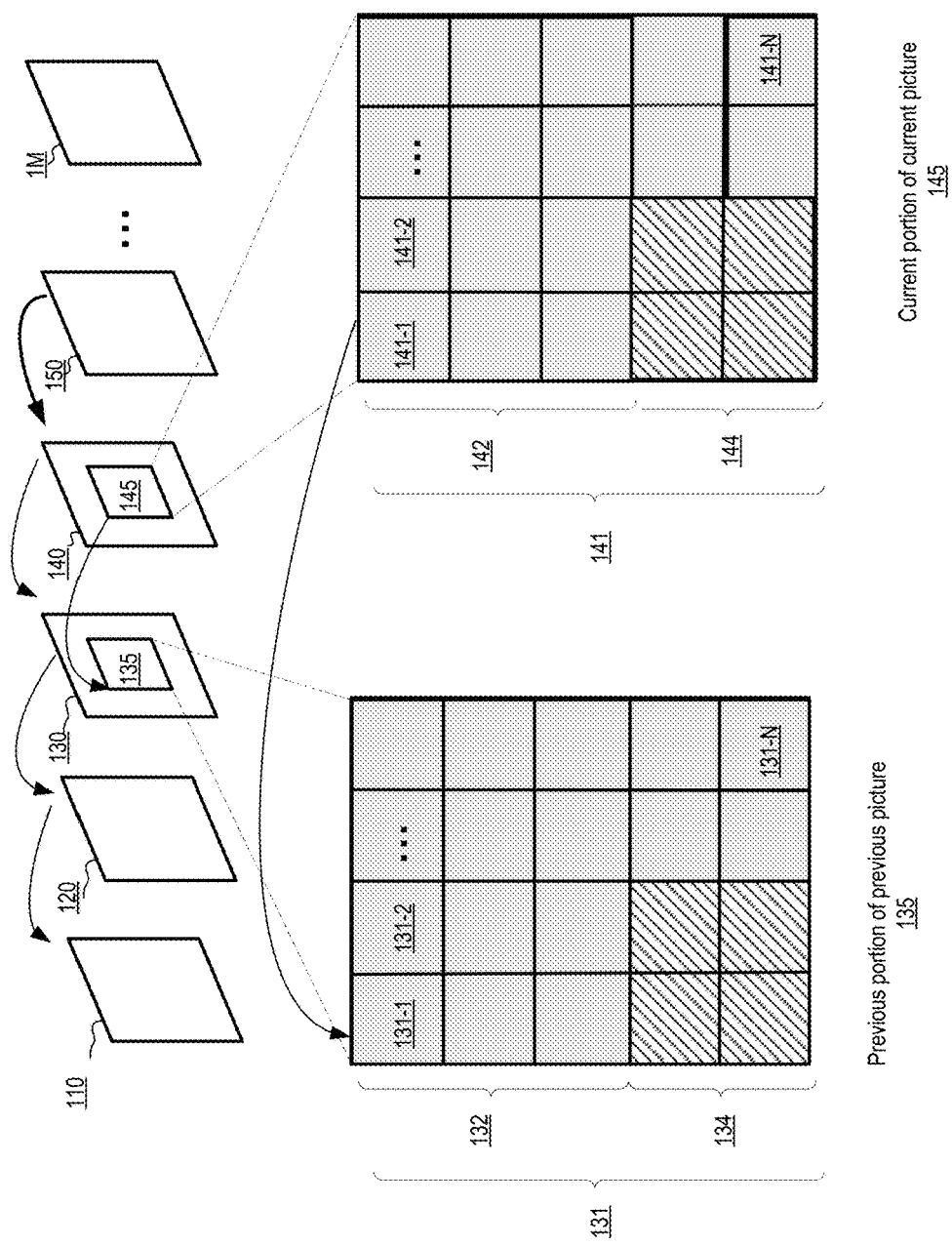
FIG. 1 illustrates exemplary successive pictures of a data stream to be compressed in a codec according to a given compression order, in accordance with some embodiments.

The following description describes methods and apparatus for compressing a stream of pictures in parallel in a compression device. In the following description, numerous specific details such as logic implementations, opcodes, means to specify operands, resource partitioning/sharing/duplication implementations, types and interrelationships of system components, and logic partitioning/integration choices are set forth in order to provide a more thorough understanding of the present invention. It will be appreciated, however, by one skilled in the art, that the invention may be practiced without such specific details. In other instances, control structures, gate level circuits and full software instruction sequences have not been shown in detail in order not to obscure the invention. Those of ordinary skill in the art, with the included descriptions, will be able to implement appropriate functionality without undue experimentation.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Bracketed text and blocks with dashed borders (e.g., large dashes, small dashes, dot-dash, and dots) may be used herein to illustrate optional operations that add additional features to embodiments of the invention. However, such notation should not be taken to mean that these are the only options or optional operations, and/or that blocks with solid borders are not optional in certain embodiments of the invention.

In the following description and claims, the terms "coupled" and "connected," along with their derivatives, may be used. It should be understood that these terms are not intended as synonyms for each other. "Coupled" is used to indicate that two or more elements, which may or may not be in direct physical or electrical contact with each other, co-operate or interact with each other. "Connected" is used to indicate the establishment of communication between two or more elements that are coupled with each other.

Pictures of desktop data streams (which are referred to herein as desktop streams) present unique characteristics compared to pictures of other types of image data stream. For example, a typical picture from a desktop stream includes portions that remain static (e.g., the background and certain windows that are open on the desktop picture) while other portions of the desktop (e.g., a window displaying video) may be in motion. There can be long periods of user inactivity where the desktop pictures remain static followed by sudden peaks of user activity (e.g., when the user opens or moves a window) which put high demands on the system causing unacceptable latency.

Therefore, encoding a desktop image data stream poses unique challenges compared to encoding other types of image data streams.

Challenges of Standard Compression Mechanisms:

Several mechanisms and codecs exist for encoding images. However, all known techniques fail to provide adequate compression of desktops while maintaining a good quality of compression and a low latency. For example, codecs designed for encoding video typically focus on encoding pictures in motion, where a lesser quality is acceptable given the picture is only viewed for a short period of time. These techniques are not optimized for static pictures, which require a better picture quality as the static pictures are displayed for a longer period. Codec designed for encoding desktop pictures support compression of static and non-static regions of pictures. However, these types of codecs do not address the issue of latency.

Some standard techniques are designed to provide a low latency compression (e.g., techniques based on rate control mechanism or parallel processing of pictures). However, these techniques typically reduce latency by compromising on the quality of the pictures (in particular the quality of static regions in the pictures).

Therefore, there is a need for a method and apparatus for encoding/compressing pictures that provide both an improved image quality of the pictures (e.g., in static regions of the pictures) and a reduced latency.

Regions of Successive Pictures:

FIG. 1 illustrates exemplary successive pictures of a data stream to be compressed in a codec according to a given compression order, in accordance with some embodiments. Pictures 110-1M are successively compressed in a codec starting with picture 110 followed with 120, 130, 140 . . . until 1M. A picture may refer to a frame when the scan mode of the stream of pictures is progressive. Alternatively, a picture may refer to a field when the scan mode of the stream of pictures is interlaced. Pictures 130 and 140 are illustrated in further details. In some embodiments, a portion of a picture corresponds to multiple macroblocks. For example, a portion of a picture may be a slice or a plurality of slices. Each picture may include one or more portions (e.g., portion 135 and portion 145) and each portion includes one or more regions. In FIG. 1, the number of regions N=20 in the portions 135 and 145 is intended to be exemplary only, and not limiting. Each portion may include any number N of regions. A region is a sub-set of a portion comprising a macroblock or a group of macroblocks. Each of portion 135 and portion 145 includes static and non-static regions. In a non-limiting example, the non-static regions can be related to video content or video game content displayed in an application of a desktop display, while the static regions include graphical content of the desktop display that remains motionless over a number of successive pictures. Other examples of pictures including static and non-static content can be contemplated without departing from the scope of the present invention.

Portion 135 includes a set of regions 131, from region 131-1 to region 131-N. The set of regions 131 includes a first subset 134 of non-static regions (i.e., the striped regions) and subsets of static regions 132 (i.e., the plain regions). Portion 145 comprises the regions 141 (from region 141-1 to region 141-N) including non-static regions (e.g., the subset of regions 144 (i.e., the striped regions)) and static regions (subset 142 (i.e., the plain regions)). Each region from portion 135 has a corresponding region from portion 145 that is located at the same location within its respective picture. For example, region 131-1 in picture 130 is located at the same position as 141-1 in portion 145 and region 131-N in portion 135 is located at the same position as 141-N in portion 145. Given that picture 130 is compressed prior to picture 140 it may be referred to as a "previous picture" relative to picture 140. Regions 131-1 and 141-1 are an example of successive regions located at the same location in successive pictures. Each one of region 131-1 and region 141-1 comprises at least one macroblock. In this example, the subset 142 includes regions that remain static from picture 130 to picture 140 such that a region within subset 142 is substantially identical to a corresponding region located at the same location within subset 132.

Figure 2A:
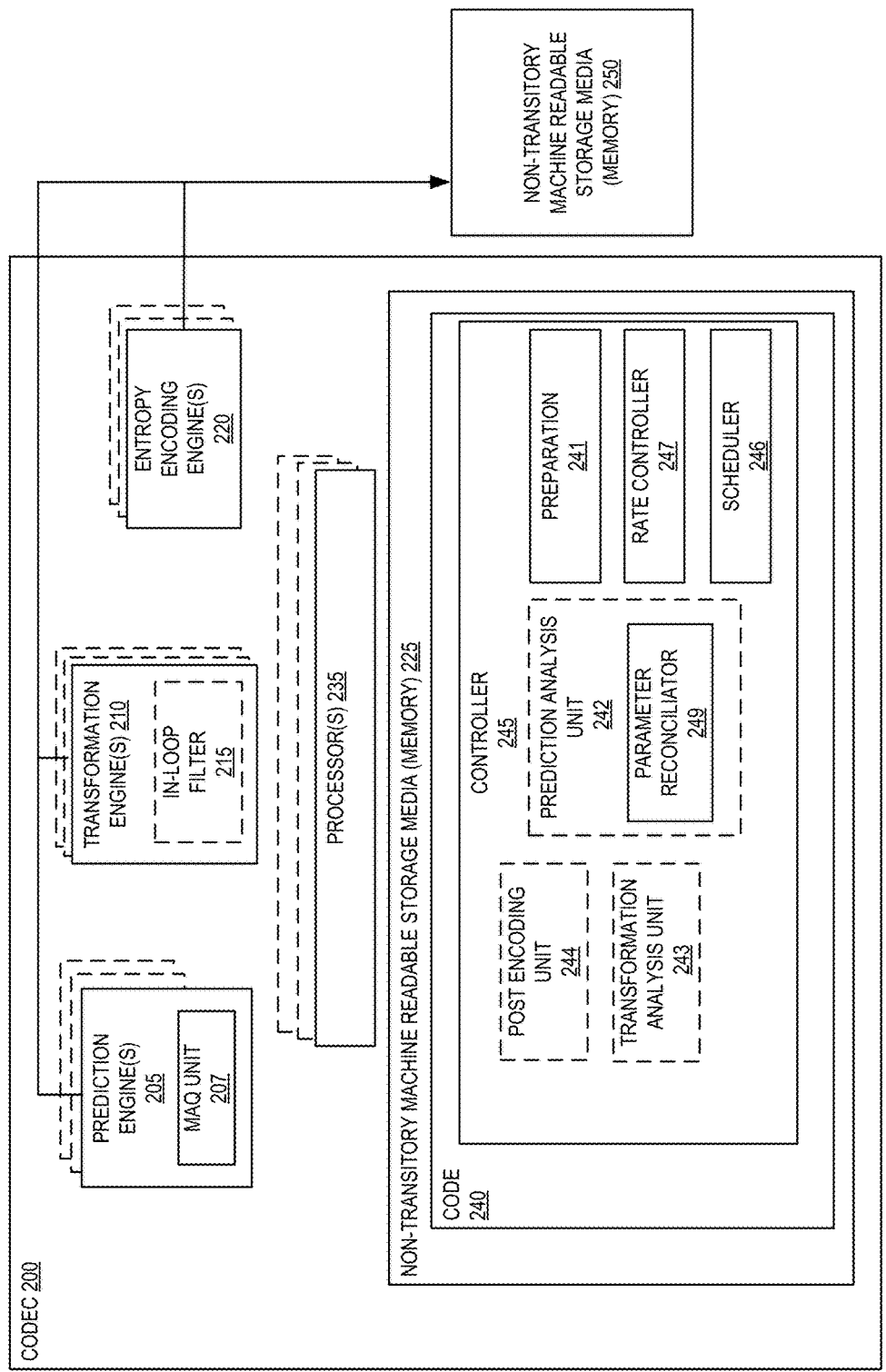
FIG. 2A is a block diagram of an exemplary codec for enabling low-latency compression of streams of pictures in accordance with some embodiments of the invention.

FIG. 2A is a block diagram of an exemplary codec 200 for enabling low-latency compression of streams of pictures in accordance with some embodiments of the invention. While the embodiments below will be described with respect to a codec 200 (i.e., a device enabling compression and decompression of image data); other embodiments can be performed in a device which enables compression only (which may be referred to as an encoder or a compression device) without departing from the scope and spirit of the present invention.

The codec 200 provides an exemplary special purpose compression/decompression device for implementing a compression pipeline according to some embodiments. In alternative embodiments, other pipelines (with a different task combination and division) can be used to enable compression of image data and therefore other codec architectures can be used for implementing the pipeline without departing from the scope of the present invention. In some embodiments, the codec is operative to process streams of pictures, where portions of pictures are processed in a sequential order. In other embodiments, the codec is operative to process streams of pictures, where portions of pictures are processed in parallel. In some embodiments, the codec may be configurable and operative to perform compression in parallel or in sequence according to configuration parameters.

The illustrated exemplary codec 200 discloses multiple dedicated hardware components (e.g., a multiple prediction engine(s) 205, multiple transformation engines 210, and multiple entropy encoding engines 220) implementing a compression pipeline in which a plurality of portions of pictures (from the same or different pictures) can be processed in sequence or in parallel. For example, the codec may include a plurality of engines of each type. In these embodiments, each engine is replicated such that the codec may implement a plurality of pipelines. Further, the codec may include multiple processors for implementing duplicated instances of software components of the pipeline (e.g., the controller 245 which includes: the preparation 241; the rate controller 247; the scheduler 246; the post encoding unit 244; the transformation analysis unit 243; and the prediction analysis unit 242; that includes the parameter reconciliator 249). Each component may include a number N of duplicated instances (hardware or software instances) which is different from a number M of duplicated instances of another component.

The codec includes code/instructions 240 stored on a machine-readable storage media 225 which when executed on one or more processors (e.g., processors 235) is operative to configure and control the different components of the codec for compressing and/or decompressing image data. Upon receipt of a request for compression of image data from an application, the codec is configured according to the compression request and parameters to compress the image data. The parameters may be general parameters defining how the image data is to be compressed. For example, the parameters may comprise picture resolution and timings (e.g. pixel format, size, pixel depth, scan mode, frame rate), slice type and size, information relative to the sequence of pictures (e.g. picture hierarchy, Group Of Picture (GOP) structure (I period, P period, Idr period), GOP offset, a target bit rate, allowed drift from the target bit rate, the latency, coding functions and other information delimiting the operational mode of the codec for processing the stream of pictures (e.g., rate control mode, minimum and maximum QP, QP correction tensors, QP offsets, scene detection threshold, PSNR offsets).

In some embodiments, the request received is for processing a stream of pictures and the request is broken down into multiple requests for processing portions of the picture. In other embodiments, the request received may be for processing a portion of a picture and the request is processed without being broken down.

In some embodiments, the code includes controller 245 (including the preparation 241, the rate controller 247, the scheduler 246, the post encoding unit 244, the transformation analysis unit 243, and the prediction analysis unit 242 that includes the parameter reconciliator 249). Thus, in some embodiments, these operations are implemented as code/instructions stored on a machine-readable storage media which when executed on a processor (235) enable the codec to perform operations described with references to one or more of the figures below.

The codec includes one or more prediction engines 205, one or more transformation engines 210, one or more entropy encoding engines 220, and one or more processors 235, each coupled with a non-transitory machine-readable storage media 250, which is referred to herein as memory 250. In some embodiments, the memory 250 is external to the codec (e.g., memory 250 can be memory 910 of processing system 900) and it is coupled to the various components (e.g., prediction engines 205, transformation engines 210, entropy encoding engines 220, and/or processors 235) through a memory interface (not shown). In some of these embodiments, the memory interface is internal to the codec 200, while the memory 250 is external to the codec 200. In an alternative embodiment, both the memory interface and the memory 250 are external to the codec 200. In some embodiments, prediction engines 205, transformation engines 210 and entropy encoding engines 220 are operative to read and write data to memory 250 without passing through the processors 235. Alternatively, in other embodiments, the prediction engines 205, transformation engines 210 and entropy encoding engines 220 read and write data to memory 250 by passing through the processors 235, such that read and write operations are executed through the processor and transmitted to the appropriate component. In these embodiments, the different engines would not be coupled with the memory. In some embodiments, transformation engines 210 and entropy encoding engines 220 may be connected together in order to pass information directly there between. In some embodiments, each one of the transformation engines 210 may also include an in-loop filter 215.

In general, image data is stored in the memory 250 and requests are sent to the codec 200 to compress the image data. Following the receipt of the compression requests, the controller 245 configures prediction engine 205 with appropriate parameters for processing a portion of a picture from the image data stored in memory 250. In some embodiments, the prediction engine 205 is configured with configuration parameters determined at a preparation operation.

In some of these embodiments the configuration parameters are determined in order to achieve low-latency of compression of the picture while providing a superior image compression quality. The prediction engine 205 accesses the memory 250, processes the portion of the picture, and stores the result in the memory 250. In some embodiments, the prediction engine 205 is a hardware component.

The prediction engine 205 is operative to determine a prediction mode for processing the portion of the picture. A portion of a picture and reference pictures are received, and an intra prediction or an inter prediction mode for the compression of the portion of the picture is selected. If intra prediction is selected, information contained only within the current picture may be used for the prediction. If inter prediction is selected, information from a previously encoded picture may be used in the prediction. The selection of the prediction mode is made using a variety of factors, such that the difference between a prediction and the portion of the picture is minimized Prediction parameters are generated (e.g., partitioning of the portion of picture, motion vectors, and selected reference pictures) according to the selected prediction mode. The prediction parameters are then used in the following operation of the compression of the portion.

In some embodiments, following its processing at one of the prediction engines 205, the portion of a picture is analyzed to gather a set of compression statistics related to the processing of a portion of a picture in the prediction engine. The set of compression statistics is then used by the controller 245 to determine configuration parameters for a new portion of picture. The compression statistics can be stored in memory 250 to be read by the controller 245 or transmitted directly to controller 245.

The transformation engine 210 is configured with appropriate parameters and retrieves the portion of the picture from the memory 250 in order to process it. In some embodiments, the transformation engine 210 is a hardware component. The prediction parameters, mode selection and reference pictures are used in the transformation engine 210 to generate the prediction, which is subtracted from the portion of the picture to generate a residual. The residual is then transformed and quantized according to a quantization parameter (QP) to obtain a set of quantized transform coefficients. The transformation applied may depend on the algorithm followed for the compression. For example, under H.264 standard, various transforms are used depending on the type of residual data that is to be coded: a 4×4 or 8×8 DCT-based transform (Discrete Cosine Transform) is performed on luma and chroma coefficients and a Hadamard transform may be performed on DC coefficients in intra macro blocks predicted in 16×16 mode. Under other standards, other transforms may be used, as appropriate. The quantized transform coefficients generated are scaled (Q−1) and inverse transformed to produce a difference portion. The prediction is added to the difference portion to form a reconstructed portion of the picture. The reconstructed portion is a decoded and unfiltered version of the original portion of the picture.

In some embodiments, the transformation engine 210 is operative to gather a set of compression statistics related to the processing of a portion of a picture in the transformation engine. The set of compression statistics is then used by the controller 245 to determine configuration parameters for a new portion of picture. The compression statistics can be stored in memory 250 to be read by the controller 245 or transmitted directly to controller 245.

In some embodiments the portion of the picture processed by the transformation engine 210 is immediately transferred to the in-loop filter 215 for processing without going through the memory 250. In other embodiments the transformation engine 210 processes the portion of the picture and stores the result of the processing to memory 250 before the in-loop filter 215 accesses it. According to this embodiment, the in-loop filter 215 reads the portion of the picture from the memory 250, processes it, and stores the result in memory.

In a subsequent operation data is read from memory 250 and processed by the entropy encoding engine 220. In another embodiment, the entropy encoding engine 220 receives data to process directly from the transformation engine 210. In some embodiments, the entropy encoding engine 220 is a hardware component. The reconstruction parameters and transform coefficients are then used by the entropy encoding engine 220 to perform entropy encoding. In accordance with some embodiments, entropy encoding can be performed on the transform coefficients using any known entropy encoding mappings. For example, this may be done by mapping a 2×2, 4×4, or 8×8 block of quantized transform coefficients to a 4, 16, or 64-element array, respectively. Elements may be encoded using either variable-length codes such as context-adaptive variable length codes (CAVLC) and Exp-Golomb codes, or using context-adaptive arithmetic coding (CABAC), depending on the entropy encoding mode, as per H.264. Other entropy encoding compression schemes may also be applicable. Similarly, the reconstruction parameters may be encoded using any known entropy encoding mappings.

In some embodiments, the entropy encoding engine 220 is operative to gather a set of compression statistics related to the processing of a portion of a picture in the entropy encoding engine. The set of compression statistics is then used by the controller 245 to determine configuration parameters for a new portion of picture. The compression statistics can be stored in memory 250 to be read by the controller 245 or transmitted directly to controller 245.

Once the data is processed in the entropy encoding engine 220, the result of the processing is stored to memory 250 or alternatively output to an external component.

While the codec 200 illustrates a set of components performing operations for compressing an image data, other embodiments of the codec can be used. For example, some components can be combined in a single component without departing from the scope of the present invention (e.g., each one of the transformation engines 210 can be combined with a respective one of the entropy encoding engines 220, alternatively, each one of the transformation engines 210 can be combined with a respective one of the prediction engines 205, other combinations can be performed).

Figure 2B:
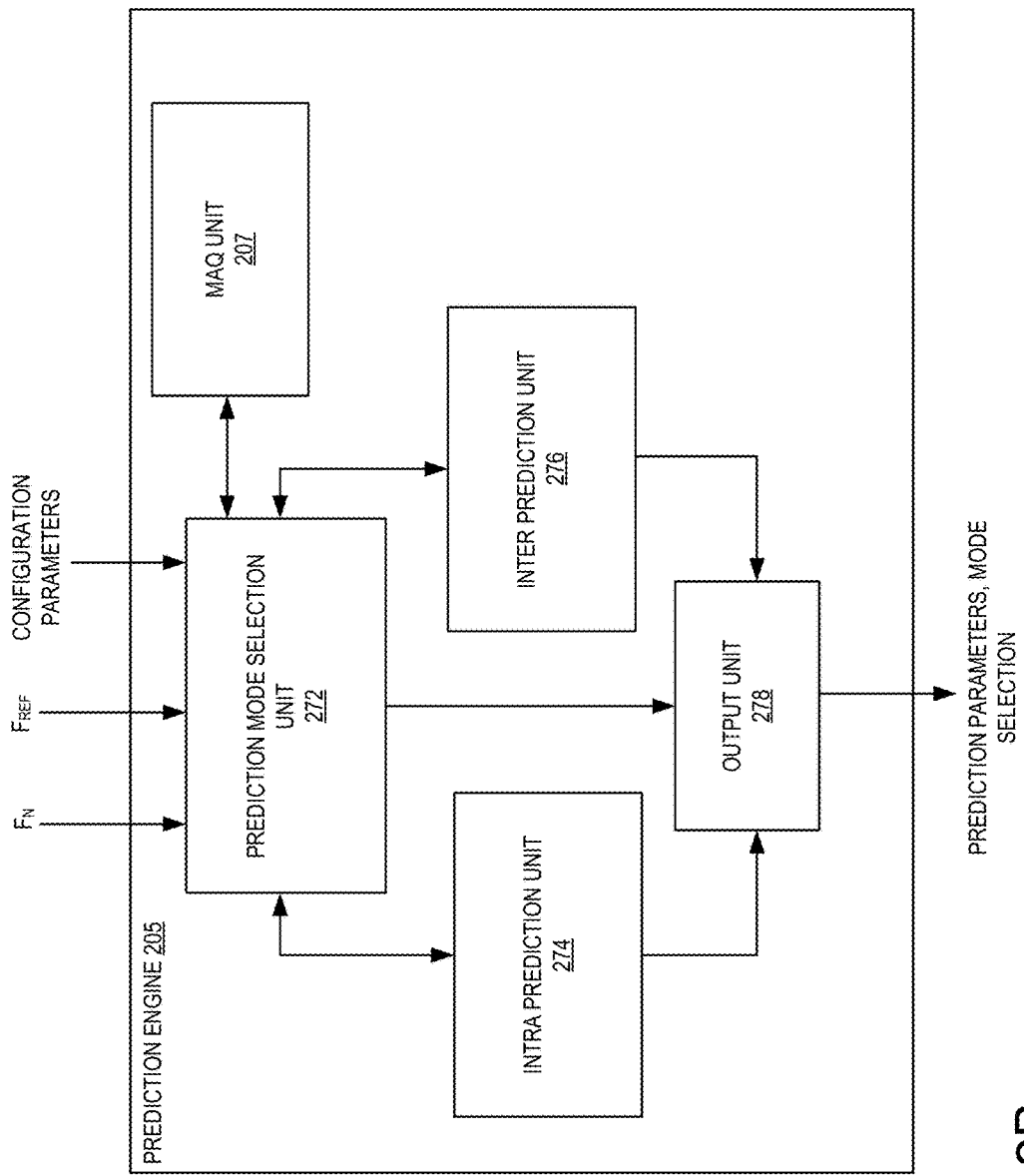
FIG. 2B is a block diagram of an exemplary prediction engine of a codec, in accordance with some embodiments of the invention.

Motion Adaptive Quantization (MAQ) Compression of Pictures:

FIG. 2B is a block diagram of an exemplary prediction engine of a codec enabling MAQ compression of pictures, in accordance with some embodiments of the invention. The prediction engine 205 includes a prediction mode selection unit 272, an intra prediction unit 274, an inter prediction unit 276, a MAQ unit 207, and an output unit 278. A prediction mode selection unit 272 receives configuration parameters, region $F_N$ and reference pictures $F_{REF}$, and chooses between an intra prediction mode and an inter prediction mode for the compression of the region. If intra prediction is used, information contained only within the current picture may be used for the prediction. If inter prediction is used, information from a previously encoded picture may be used in the prediction. The selection of the prediction mode is made using a variety of factors, such that a difference between a prediction and the image data is minimized The selected mode is sent to an output unit 278. The intra prediction unit 274 is used to generate prediction parameters according to an intra mode, such as the partitioning of the region. The inter prediction unit 276 is used to generate prediction parameters for an inter mode, such as the partitioning, motion vectors, and selected reference pictures. The prediction parameters from both the intra prediction unit 274 and the inter prediction unit 276 are provided to the output unit 278. In some embodiments, both sets of prediction parameters are output with the mode selection. Alternatively, only the prediction parameters corresponding to the selected mode are output from the prediction engine 205.

The prediction engine 205 also comprises a MAQ unit 207 for performing Motion-based Adaptive Quantization (MAQ). In addition, the codec 200 may comprise a MAQ mode register to enable the MAQ mode. When the MAQ mode is enabled the codec 200 configures the prediction engine 205, the transformation engine 210 and the entropy encoding engine 220 with appropriate parameters to compress image data in accordance with motion-based adaptive quantization. In this mode, static (or motionless) regions of image data are detected in each picture and the compression quality of the motionless regions is improved. In some embodiments, the compression quality of the motionless regions is gradually improved over successive pictures.

The quality improvement is performed in part by modifying the quantization parameter of each detected motionless region and setting it to an appropriate value. The quality improvement is interrupted when a non-static region is detected. When a new static region is detected, the quality improvement scheme resumes. For example, in the embodiments where the quality improvement is performed gradually over successive picture, the quantization parameter varies again. The quality improvement scheme is performed during compression of the region, without preprocessing, and in substantially real time reducing latency between the compression and the display of pictures when the compression and display of pictures are in the same order. The quantization parameter of each region is adapted in order to obtain a customized and ideal compression quality for that macroblock.

Motion-based Adaptive Quantization may be performed on a picture-by-picture basis for subsets of pictures. In general, a data stream may comprise at least one picture, each picture comprising static (still) regions and non-static regions. A region includes a macroblock or a group of macroblocks. Thus, MAQ may be performed on each macroblock such that each macroblock is separately encoded with an appropriate quantization parameter. In another embodiment, MAQ may be performed on a group of macroblocks comprising more than one macroblock, such that all macroblocks of the group are encoded with a common quantization parameter.

The prediction engine 205 may access the memory to read the region $F_N$ and reference pictures $F_{REF}$. Once the region has been processed, the resulting prediction parameters and mode selection are written to memory.

Figure 2C:
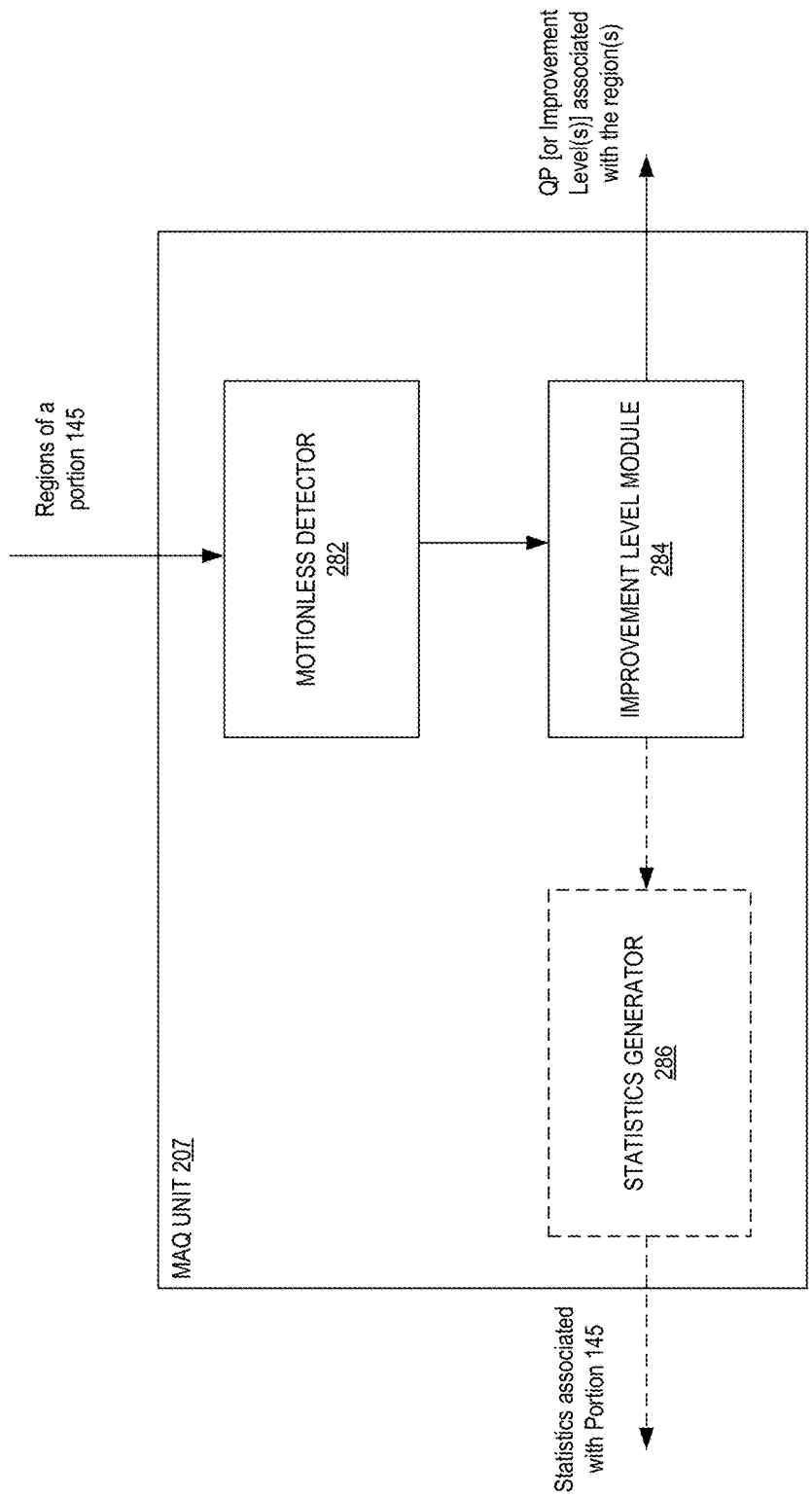
FIG. 2C is a block diagram of an exemplary MAQ unit of a prediction engine, in accordance with some embodiments of the invention.

FIG. 2C is a block diagram of an exemplary MAQ unit of a prediction engine, in accordance with some embodiments of the invention. As illustrated in FIG. 2C, the MAQ unit 207 may comprise a motionless detector 282, an improvement level module 284, and a statistics generator 286. The motionless detector 282 is illustrated as being inside the MAQ unit 207 for simplicity but may reside outside, as motion estimation and motion compensation may be performed in other sub-modules of the prediction engine.

The motionless detector 282 is adapted to determine whether a region is motionless during its processing in the prediction engine 205. This requires comparing each region with a reference region, namely a region at a same position in a preceding picture, in order to detect change between the two regions (for example, when processing picture 140, the region 141-1 is compared with its preceding region 131-1). In one embodiment, the change is detected by comparing the two regions and verifying if they are substantially identical or not. A first reference picture is thus used to detect motionless regions in a picture. In some embodiments, the same reference picture may be used to detect motionless regions and for their compression in the prediction engine 205 and the transformation engine 210. In some embodiments, a second reference picture different from the first reference picture is used during the actual compression step of the motionless regions.

In some embodiments, the sum of absolute difference (SAD) between a region (e.g., region 141-1) and its preceding region (131-1) in the reference picture may be computed and used to determine if a region is static (i.e. is substantially identical to its preceding macroblock). In other embodiments, the sum of absolute transform difference (SATD) may be used to determine if a region is static with respect to a preceding region.

In some embodiments, when a region has been tagged as static, its compression quality is improved when compared to the compression quality of non-static regions. Quality is improved in part by decreasing a quantization parameter associated with the region from a start QP that is used for processing non-static regions to an improved QP used for processing static region. In some embodiments, when a region has been tagged as static, its compression quality is progressively improved over multiple pictures if the region remains motionless over the multiple pictures. This serves in distributing the bandwidth used to improve a still picture (or picture area) from low to high quality. It also serves to avoid wasting bandwidth when a region remains still for only a few pictures. Quality is improved in part by decreasing a quantization parameter associated with the region from a start QP to a target QP. In one embodiment, the quantization parameter associated with a region is decreased from a picture to the next picture in order to progressively improve the compression quality of that region. In another embodiment, the quantization parameter associated with a macroblock may increase, decrease or remain unchanged before reaching the target QP, the target QP being lower than the quantization parameter associated with non-static regions of a picture. In this embodiment, the overall result of the QP variation will still lead to the improvement of the compression quality of the motionless region over the successively compressed pictures.

The improvement level module 284 is adapted to determine for each region of a picture a corresponding quantization parameter based in part on the result of the processing of the region in the motionless detector 282, and the quantization parameter associated with its preceding regions. In general, the improvement level module 284 is adapted to modify the QP of successive static regions in accordance with a multi-step change from a start QP to a target QP. This sequence of changes is interrupted when a non-static region is detected, and a regular QP is applied to the non-static region. The multi-step change may cause an increase, decrease, or maintaining of a previous QP for a subsequent QP in accordance with a pre-determined or dynamically determined sequence.

In some embodiments, each region of a picture is associated with an improvement level. The improvement level module 284 may increment a counter representing an improvement level for the region. The improvement level may be a parameter associated with each region as part of the prediction parameters output by the prediction engine 205. The improvement level may be stored in memory with the prediction parameters and is used to determine the quantization parameter to apply during the quantization step of the associated region. This may be implemented with a finite state machine, each state representing an improvement level having a QP associated thereto, and the detection of motionless regions acting as the triggering condition for each transition.

In some embodiments, a statistics generator 286 may be provided in the MAQ unit 207 of the prediction engine 205 to maintain statistics of the quantization parameters used in a picture. The quantization parameters associated to a plurality of static regions in a picture may thus be adapted as a function of these statistics. A counter may determine the number of regions compressed according to a given quantization parameter for each picture, or for each portion (e.g., a slice) of a picture. In the embodiments, where the limits are defined for a group of quantization parameters, values of the counters of each QP from the group are added together to form the statistics for the group of QPs. These statistics may be used to change the quantization parameters associated with each region of a picture.

Bit Rate Control:

The codec 200 is also operative to enable compression of a data stream according to a bit rate control mechanism to operate in a controlled bit rate mode. In some embodiments, when operating in a "controlled bit rate" mode, a codec allocates for each GOP of a stream of pictures an associated number of bits. The allocated number of bits represents the number of bits the compressed GOP can have in order for the codec to achieve a target bit rate. Each GOP is comprised of a plurality of pictures. The plurality of pictures may be grouped in subsets of a GOP referred to as subGOPs. A subGOP may be a single picture, a series of B type pictures with some of the pictures they refer to. Similarly, the codec distributes the GOP's allocated number of bits to its subGOP and distributes each subGOP's allocated number of bits to the portions of picture comprised in the subGOP. The allocated number of bits will allow the codec to keep track of bits used to compress portions of the data stream relative to the number of bits allowed and achieve compression of the stream of pictures according to the target bit. The allocated number of bits further allows the codec to determine appropriate compression parameters for compressing the portions of the subGOP. The determination of the allocated number of bits is performed upon scheduling of the GOP of pictures at the compression device.

In other embodiments, the bit rate control mechanism is an adaptive bit rate control, in which a budget of bits is distributed dynamically on a portion of pictures when the portion is evaluated with respect to portions of a dynamic set of portions. In some embodiments, the adaptive bit rate control takes into consideration recent compression statistics of the latest portions processed in the compression device into the determination of the configuration parameter. In one embodiment, the compression statistics may include partial compression statistics resulting from the processing of a picture in the compression device when the compression of the picture is not yet completed.

Figure 3:
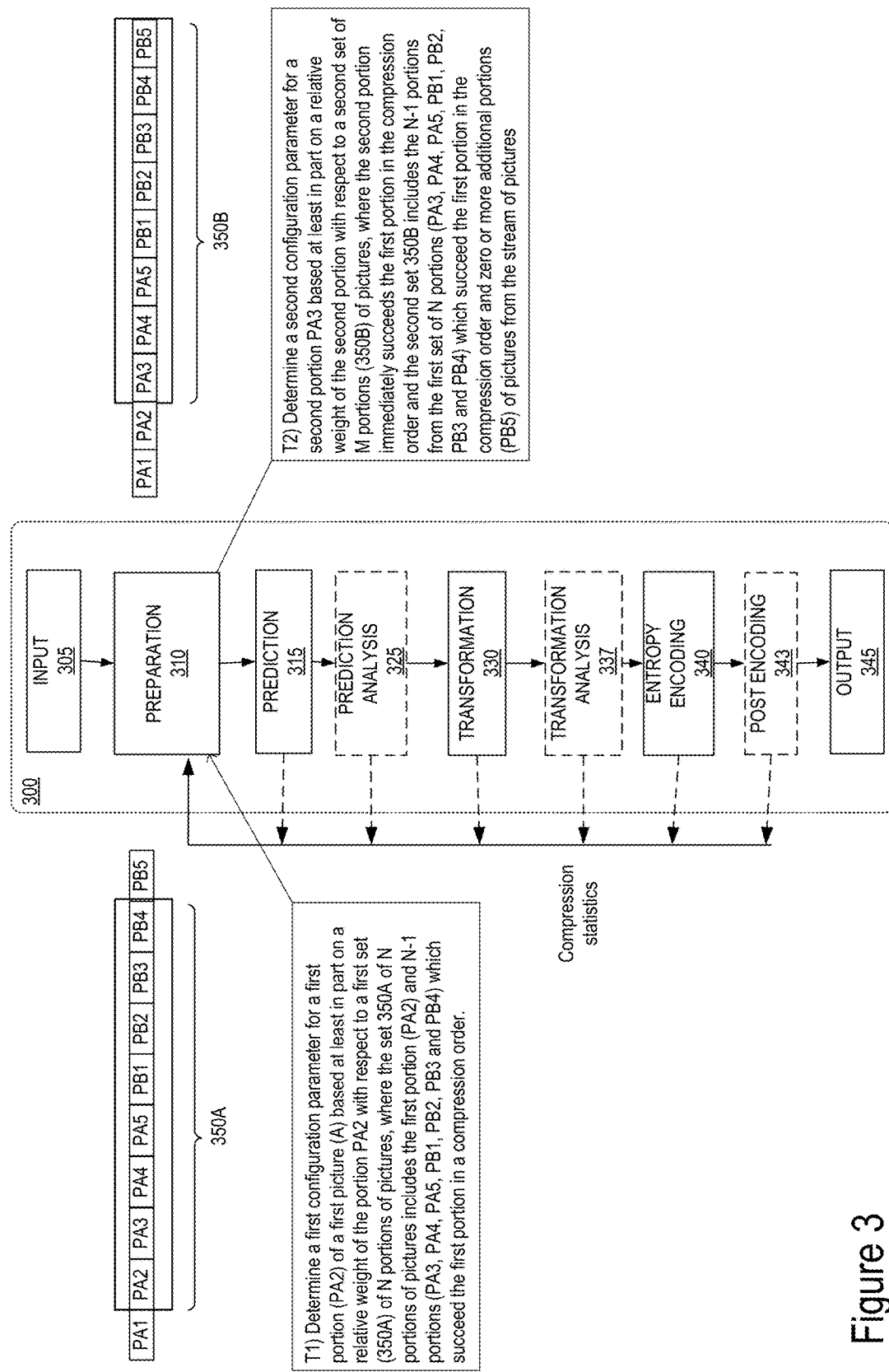
FIG. 3 illustrates a block diagram of operations performed by an adaptive rate control mechanism, in accordance with some embodiments.

FIG. 3 illustrates an exemplary block diagram of a compression pipeline 300 enabling adaptive bit rate control of image data compression in accordance with some embodiments. The compression pipeline represents multiple operations 305-345 performed in a codec (e.g., codec 200) for compressing image data. The compression pipeline 300 includes an input operation 305, a preparation operation 310, a prediction operation 315, a transformation operation 330, an entropy encoding operation 340, a post encoding operation 343, and an output operation 345 for processing image data. In some embodiments, the compression pipeline may further include a prediction analysis operation 325 and a transformation analysis operation 337. In alternative embodiments, the compression pipeline 300 does not include at least one of the prediction analysis operation 325 and the transformation analysis operation 337.

In some embodiments, a portion may represent a parallelized item such that each operation of the compression pipeline 300 is operative to process a portion of a picture at a given time T, while other operations of the pipeline are operative to process other portions of pictures at that same time T.

When the codec is set to operate in an adaptive rate control mechanism, it is configured to perform the operations described with respect to the compression pipeline 300. According to one embodiment, at the input operation 305 a request to compress image data is received. The preparation operation 310 is operative to determine configuration parameters for configuring each following operation of the pipeline for processing a current portion of a first picture. The determination of the configuration parameters for a current portion of a first picture is based, at least in part, on a relative weight of the portion with respect to a set of N portions of pictures from the stream of pictures. The set of N portions of pictures includes the current portion and N−1 portions which succeed the current portion in a compression order. In some embodiments, the relative weight of a portion may depend on compression statistics resulting from the processing of other portions in the compression pipeline. The more recent these statistics are, in terms of picture timeline, the better the prediction for a new picture will be. In some embodiments, the compression statistics include partial compression statistics resulting from the partial processing of a picture in the pipeline. For example, the partial compression statistics result from the processing of other portions of the same picture (first picture) and/or portions of pictures which precede the first picture in the compression pipeline 300, while the compression of this picture is not yet complete. In some embodiments, the configuration parameters may also be determined based on compression statistics related to the processing of portions of other pictures which have completed their processing in addition to the partial compression statistics. The partial compression statistics may include information related to the processing of a portion when the portion has completed its processing (e.g., effective size of the encoded portion), or intermediary information related to the processing of the portion at other operations of the pipeline.

In some embodiments, the prediction operation 315 is performed as described with reference to operations of a prediction engine 205. The transformation operation 330 is performed as described with reference to operations of a transformation engine 210. The entropy encoding operation 340 is performed as described with reference to operations of the entropy encoding engine 220.

In one embodiment, compression statistics resulting from the compression of a picture are gathered at each one of the prediction analysis operation 325, the transformation analysis operation 337 and the post encoding operation 343. These compression statistics are then fed back to the preparation operation 310 for determining the configuration parameters for processing a portion of a picture. In other embodiments, compression statistics are gathered from at least one of the prediction analysis operation 325, the transformation analysis operation 337 and the post encoding operation 343. For example, in one embodiment, compression statistics related to the compression of a portion of a picture are gathered at the post encoding operation 343 only and transmitted to the preparation operation 310. In some embodiments, one or more of the operations 325, 337 and 343 can be skipped.

In some embodiments, at a given time T, the compression pipeline 300 is operative to process multiple portions of one or more pictures simultaneously. In some of these embodiments, the compression pipeline 300 is operative to process portions of a same picture in parallel, and wait for the completion of this picture prior to processing the following picture. In some embodiments, the compression pipeline 300 is operative to process portions of at least two different pictures in parallel. In some embodiments, the compression pipeline 300 may be operative to process portions of pictures sequentially such that each portion is processed once the processing of the preceding portion has been completed.

The operations performed in the compression pipeline of FIG. 3 will be described with reference to a picture A and a picture B. In an exemplary embodiment, pictures A and B are divided into a same number of portions, where each portion has a corresponding portion in the other figure which is identical in size and position (e.g., portions PA1, PA2, PA3, PA4, and PA5 correspond to portions PB1, PB2, PB3, PB4, and PB5 respectively; each of these couple of portions (e.g., PA1 and PB1) are located at the same position (X, Y) within their respective pictures and have the same size (i.e., include the same number of macroblocks)). Picture B follows picture A in a compression order such that the first portion PB1 of picture B is processed after the last portion PA5 of picture A.

In embodiments described herein, in order to provide compression of a stream of pictures according to a target bit rate, the codec determines compression parameters for processing a new portion from the stream when the portion is scheduled to be processed in the compression pipeline 300. Further, the configuration parameters are determined with respect to a weight of the portion relative to a set of portions. The set of portions is determined dynamically and is associated with the portion to be processed. In some embodiments, the configuration parameters include a quantization parameter and/or a set of coefficients representative of the quantization parameter for compression of the first portion. For example, the set of coefficients may be a plurality of quantization parameter offsets and biases which may vary according to the type and size of a portion. In one example, the configuration parameters may further include an inter-offset bias (which is used in the determination of the prediction mode at the prediction operation 315). In another example, the configuration parameter may include a decision to dynamically modify the structure of the GOP (GroupOfPicture) to be processed. The configuration parameters may further include an indication to skip compression of a portion (by generating a Pskip for the portion). The configuration parameters listed herein are exemplary only, and other configuration parameters may be determined.

At time T1, the portion PA2 is scheduled to be processed at the preparation operation 310. At this operation, the codec determines one or more configuration parameters for processing portion PA2 of picture A based at least in part on a relative weight of the portion PA2 with respect to a first set (350A) of N portions of pictures. The set 350A of N (e.g., N=8) portions of pictures includes the first portion (PA2) and N−1 portions (PA3, PA4, PA5, PB1, PB2, PB3 and PB4) which succeed the first portion in a compression order.

At time T2, the portion PA3 is scheduled to be processed at the preparation operation 310. At this operation, the codec determines a second configuration parameter for processing portion PA3 based at least in part on the relative weight of this portion with respect to a second set of M portions of pictures (the set 350B). Portion PA3 immediately succeeds the first portion PA2 in the compression order and the second set 350B includes the N−1 portions from the first set 350A (i.e., portions PA3, PA4, PA5, PB1, PB2, PB3 and PB4) which succeed the first portion in the compression order and zero or more additional portions of pictures (e.g., portion PB5) from the stream of pictures. Thus, when the second portion PA3 is scheduled to be processed in the compression pipeline 300, configuration parameters for processing this portion are determined based on the set of portions 350B that includes non-processed portions of the stream of pictures, which is different from the set 350A used to determine the configuration parameters for processing the preceding portion PA2. The set of portions is dynamically updated each time a new portion is scheduled to be processed in the compression pipeline. While in the illustrated example, the set 350B includes the subset of N−1 remaining portions of the set 350A and an additional portion, in other embodiments, the set 350B may include only a subset of portions from the remaining N−1 portions, where the subset is strictly less than the N−1 portions. In other embodiments, the set of portions may include in addition to the N−1 portions more than one additional portion.

In order to determine configuration parameters for processing portions of a stream of pictures, which is to be compressed according to a target bit rate, a bit budget is distributed over the portions of a dynamic set of portions based on the relative weight of each portion with respect to all portions in the set. Thus, in the example presented in FIG. 3, when a number of bits is allocated from the bit budget to portion PA2, this number of bits is determined according to a relative weight of the portion PA2 when compared with the portions of the set 350A. Alternatively, when a number of bits is allocated from the bit budget to portion PA3, this number of bits is determined according to a relative weight of the portion PA3 when compared with the portions of the set 350B which does not include the previously scheduled portion PA2. While the illustrated embodiment provides an example in which a portion succeeding portion PA2 is from the same picture A, in other embodiments, a succeeding portion can be from another picture.

Thus, the embodiments of the adaptive bit rate control present a dynamic distribution of budget that is performed at the level of the scheduling of the portion. In other words, an allocated number of bits (and consequently configuration parameters (e.g., a QP)) is determined for a portion only when the portion is ready to be scheduled for processing at the compression pipeline ensuring that the most recent compression statistics providing from the compression of other portions/pictures are available for the determination of these parameters. Further, the determination of the allocated bits is performed according to a dynamic set of pictures which is redefined at the moment of scheduling of a portion providing a high level of adaptability such that corrections to the quality and/or compression bit rate are quickly addressed.

Low Latency Compression of Pictures:

Some display application (e.g., desktop applications) need to ensure an ultra-low latency while preserving a good quality of compression of a stream of pictures. In order to achieve low latency or ultra-low latency and high compression quality when compressing a stream of pictures, the codec 200 is configured to put more quality on portions of the desktop that are not moving while reducing the quality on portions of the desktop that are moving using a MAQ mechanism, and configured to limit the latency to a minimum, by performing an adaptive bit rate control.

As discussed with reference to FIG. 2A, the codec 200 is operative to compress a picture in parallel such as each engine/stage of the codec processes a slice while the others process different slices of pictures. Thus, the codec 200 executes multiple portions concurrently at different stages in the encoding pipeline, and outputs a portion as soon as its compression is completed, even when processing of the entire picture is not yet complete. Further, the embodiments described above illustrate two modes of operations of the codec 200, namely the MAQ and the bit rate control modes. When operating in the MAQ mode, the codec 200 is operative to dynamically increase the compression quality of static regions while compressing non-static regions with a lower quality. As a result, this mechanism may inject unpredicted high variations of bits into the data stream, which makes the prediction for the rate control complex and has a very negative impact on the latency.

When operating in an adaptive bit rate control mode, the codec 200 is operative to process pictures in parallel at the portion level and to make decision based on partial picture information. However, in contrast to when the codec operates in the MAQ mode, in a bit rate control mode, the codec 200 is operative to adapt the compression parameters of the portions of stream to converge the compression bit rate of the stream toward the target bit rate. In this mode, when the bit rate control mechanism determines that not enough bits were spent for a portion of a picture (e.g., because the scene in the picture is of relatively small complexity and the portion is easy to encode), it continuously increases the quality of compression of the portions until it reaches a minimum predetermined QP. The bit rate control mechanism accumulates any bits not spent in a bit budget parameter and will use these bits when compressing more complex scenes that occur in following portions of pictures. While enabling parallel processing and an adaptive bit rate control allows for ultra-low latency compression, this mode is not optimized for content that includes significant static portions (e.g., desktop content). The rate control mechanism may inject high peaks of bit rate when processing of a stream passes from compressing simple to more complex scenes, which has a negative impact on the latency. Further, the MAQ mode and the adaptive bit rate control mode are designed to have the primary control of the quality of the stream and neither of them takes into account that there is another module to control the quality. A standard codec is operative to process pictures in one mode or the other such that the quantization parameter associated with portions of pictures is determined according to a MAQ mechanism or to a rate control mechanism exclusively.

The embodiments of the present invention describe a method and apparatus for enabling low-latency compression of a stream of pictures. When the codec operates in the ultra-low latency mode, it is operative to perform the following operations when compressing a current picture. A first set of static regions of a current picture from the plurality of pictures is determined, where each region from the first set is static. A region is determined to be static when it is substantially identical to a previous region located at the same location in a previous picture that precedes the current picture in a compression order. A second set of regions of the current picture is determined, where the second set includes all regions of the current picture that are not included in the first set. Compression of the first set of regions is performed based on values of a first quantization parameter determined by a MAQ mechanism. The MAQ mechanism is operative to dynamically increase the compression quality of static regions. Compression of the second set of regions is performed based on values of a second quantization parameter determined by a rate control mechanism. The rate control mechanism is operative to compress the data stream according to a target bit rate.

Thus in the ultra-low latency mode, a combination of the MAQ mechanism and the rate control mechanism is used to determine a quantization parameter for processing regions the of picture. This combination allows to obtain ultra-low latency display content while maintaining a superior quality of image. The embodiments of the present invention provide a superior user experience than prior art approaches. In particular, the embodiments of the present invention cause the compression of a stream of pictures to 1) converge toward a target bit rate, when compressing pictures with high movement; 2) to be under or converge toward the target bit rate when compressing pictures with some movement and some static; or 3) to be below the target bit rate with a higher quality and a lower bandwidth when compressing picture with low movement. Further the embodiments of the present invention limit the amplitude of the bit rate variation over the specified target bit rate.

Figure 4:
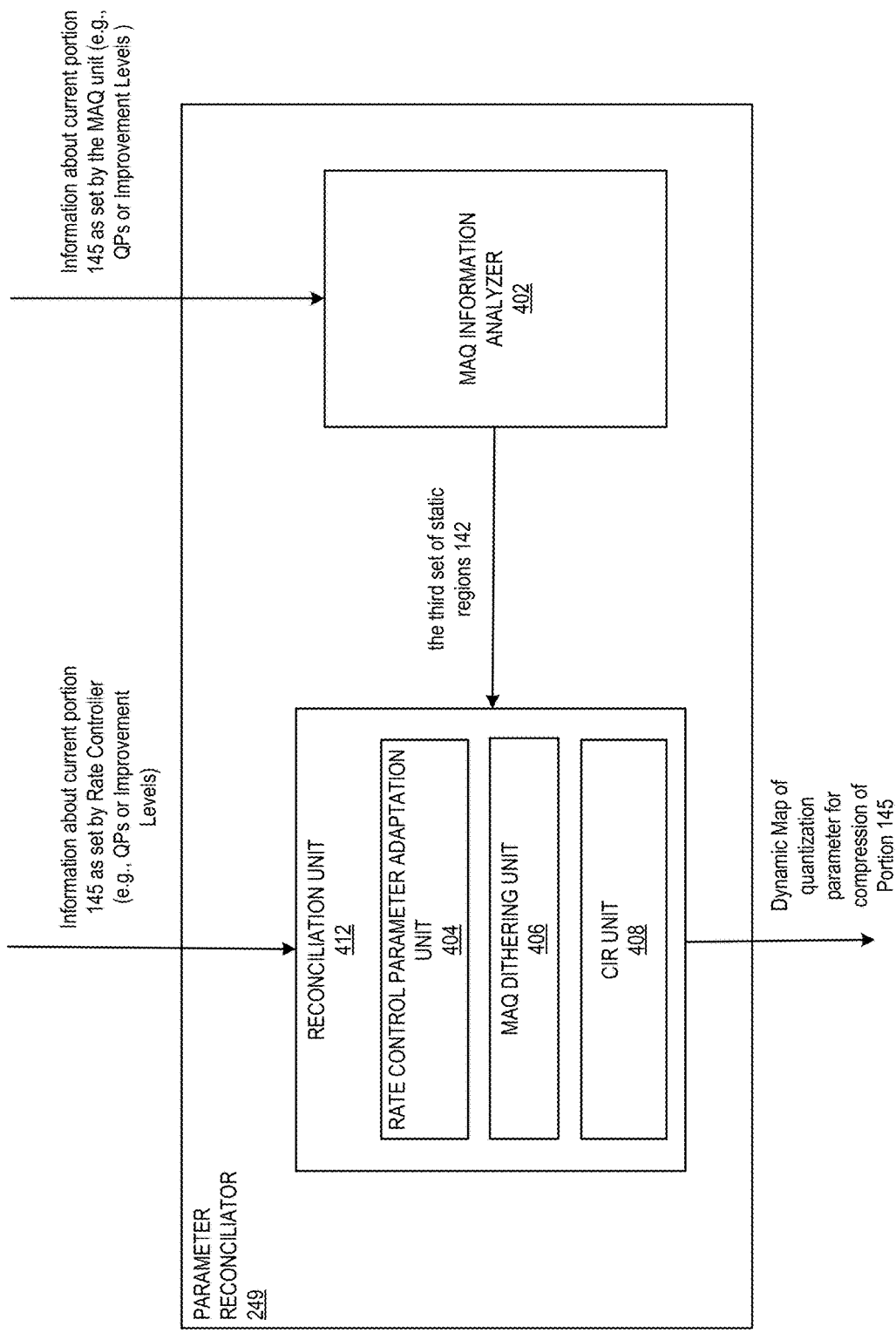
FIG. 4 illustrates a block diagram of an exemplary parameter reconciliator operative to enable low-latency compression of a stream of pictures, in accordance with some embodiments.

FIG. 4 illustrates a block diagram of an exemplary parameter reconciliator 249 operative to enable low-latency compression of a stream of pictures, in accordance with some embodiments. The parameter reconciliator includes a MAQ information analyzer 402 and a reconciliation unit 412. The reconciliation unit 412 includes a rate control parameter adaptation unit 404, a MAQ dithering unit 406, and a continuous intra refresh (CIR) unit 408. The parameter reconciliator 249 is part of the prediction analysis unit 242 of the codec 200. In some embodiments, the codec 200 may comprise a low-latency mode register to enable the low-latency mode. When the codec 200 is configured to operate in the low-latency mode, it uses the parameter reconciliator 249 for determining configuration parameters for processing a portion of a picture in the codec 200. In particular, when the low-latency mode is enabled, the codec 200 configures the prediction engine 205, the transformation engine 210 and the entropy encoding engine 220 with appropriate parameters to compress image data in accordance with motion-based adaptive quantization mechanism in combination with a controlled bit rate mechanism as will be described in further details below. In one embodiment, the parameter reconciliator 249 is operative to determine a dynamic map of quantization parameters for compressing regions of a portion. The dynamic map includes a set of quantization parameters, where each QP is to be used for compressing a respective region from the portion. The QP is used to configure the transformation engine for processing the portion.

The operations in the flow diagrams of FIGS. 5-6A-B will be described with reference to the exemplary embodiments of the other figures. However, it should be understood that the operations of the flow diagrams can be performed by embodiments of the invention other than those discussed with reference to these other figures, and the embodiments of the invention discussed with reference to the other figures can perform operations different from those discussed with reference to the flow diagrams of FIGS. 5-6A-B. For example, the embodiments below will be described with reference to FIG. 1 and current picture 140 and previous picture 130.

Figure 5:
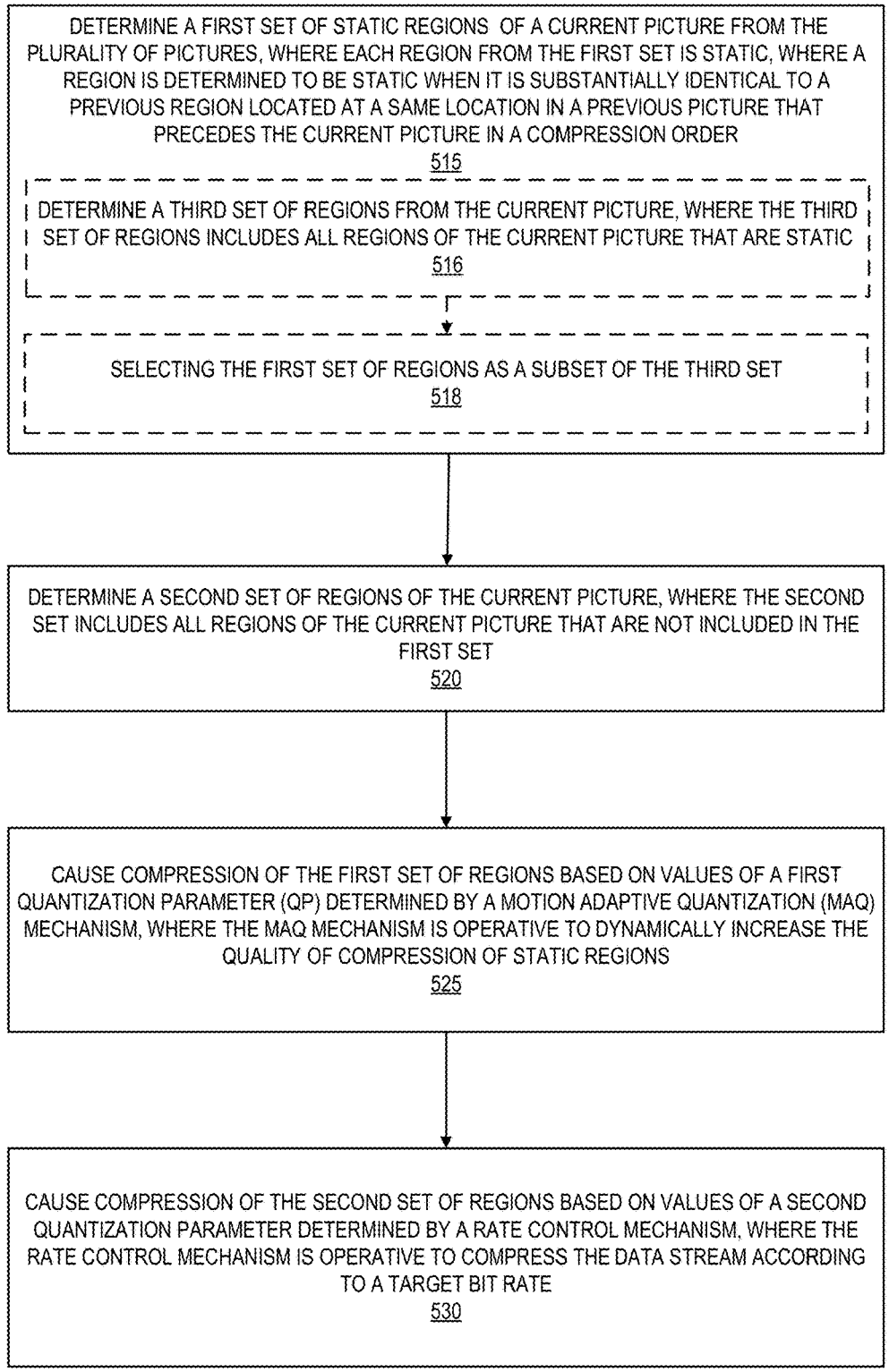
FIG. 5 illustrates a flow diagram of exemplary operations for enabling low-latency compression of a stream of pictures, in accordance with some embodiments.
Figure 6A:
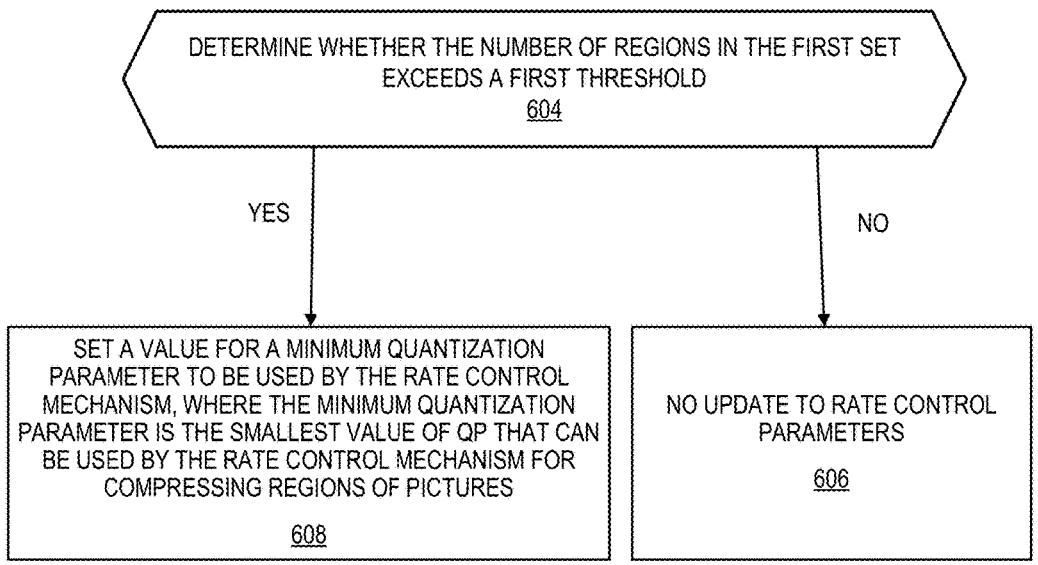
FIG. 6A illustrates a flow diagram of exemplary operations for adapting parameters of a rate controller based on the configuration parameters for compressing the first set of static regions in a picture, in accordance with some embodiments.

FIG. 5 illustrates a flow diagram of exemplary operations for enabling low-latency compression of a stream of pictures, in accordance with some embodiments. At operation 515, the MAQ information analyzer 402 determines a first set of regions of a current picture from the plurality of pictures. As discussed above with reference to the MAQ mechanism, a region is determined to be static when it is substantially identical to a previous region located at a same location in a previous picture that precedes the current picture in a compression order. In some embodiments, determining the first set of regions includes operations 516 and 518. At operation 516, a third set of regions from the current picture is determined. The third set of regions includes all regions of the current picture that are static, i.e., that were determined to be substantially identical to a previous region. For example, when processing the current portion 145, the MAQ information analyzer 402 determines that the third set of regions is the set of regions 142, where each region from this set is static (i.e., they are substantially identical to corresponding set of regions 132). At operation 518, the first set of regions is selected as a subset of the third set. In some embodiments, the first set of regions can include all the regions of the third set (i.e., all the static regions of the current picture), in other embodiments, the first set of regions includes strictly less than all the regions of the third set (i.e., some of the static regions will not be selected to be part of the first set).

At operation 520, the MAQ information analyzer 402 determines a second set of regions of the current picture, where the second set includes all regions of the current picture that are not included in the first set. The second set of regions includes non-static regions. In addition, the second set of regions may include one or more static regions that are not to be compressed based on the MAQ mechanism. For example, when processing the current portion 145, the MAQ information analyzer 402 determines that the second set includes the set of regions 144 that are non-static regions. The second set may also include additional regions that are static, and which were not selected to be part of the first set (i.e., which are not to be compressed based on the MAQ mechanism).

In some embodiments, in order to determine the first set and the second set of regions, the MAQ information analyzer receives information about the current portion 145 following its processing at the prediction operation/engine (315/205). In particular, the information is received following its processing at the MAQ unit 207. The information about the current portion 145 includes quantization parameters for each region of the portion as determined by the MAQ unit 207 based on whether the region is static or non-static. As discussed above in further details with reference to FIGS. 2B-2C, in some embodiments, the MAQ unit 207 is operative to assign one of two values to a region based on whether it is static or not. In these embodiments, the MAQ unit 207 assigns to static regions a QP that causes these regions to be compressed with higher quality than the quality of the non-static regions. The MAQ unit 207 assigns to non-static regions a QP that causes these regions to be of lower quality than the static regions. In other embodiments, the MAQ unit 207 is operative to modify the QP of successive static regions in accordance with a multi-step change from a start QP to a target QP. This sequence of changes is interrupted when a non-static region is detected, and a regular QP is applied to the non-static region. The multi-step change may cause an increase, decrease, or maintaining of a previous QP for a subsequent QP in accordance with a pre-determined or dynamically determined sequence. The various MAQ mechanisms improve the overall quality of the stream of pictures.

Thus, upon receiving the information about the current portion 145 (e.g., QPs [or Improvement Levels] for regions of portion 145 as set by the MAQ unit 207), the MAQ information analyzer 402 is able to determine the third set of regions and the second set of regions, where the third set includes static regions.

In a first embodiment, the third set of regions (e.g., the set of static regions 142) is passed on to the reconciliation unit 412. In parallel to the MAQ information analyzer 402 receiving information about the current portion 145 as determined by the MAQ unit 207, the reconciliation unit 412 receives information about the current portion 145 as determined by the rate controller 247. The rate controller 247 processes the current portion 145 at the preparation operation of the codec to determine corresponding compression parameters (e.g., a corresponding quantization parameter for processing each region of the current portion 145) in order to obtain or converge toward a targeted bit rate.

For example, in some embodiments, the rate controller 247 performs an adaptive rate control mechanism that presents a dynamic distribution of budget performed at the level of the scheduling of the portion, as described in further details with reference to FIG. 3. In other embodiments, other rate control mechanisms for determining compression parameter of regions of portion 145 can be performed without departing from the scope of the present invention.

Thus, the rate controller 247 and the MAQ unit 207 have both determined compression parameters for each region from the portion 145. These two different sets of parameters (e.g., two different quantization parameters) typically differ as each set of parameters is determined to achieve a different goal for the portion and the stream of pictures. The MAQ unit 207 attempts to improve the quality of static portions regardless of the achieved compression bit rate of the stream of pictures, while the rate controller 247 tends to cause variation of the quality in order to achieve the target bit rate regardless of whether regions are static or not.

The reconciliation unit 412 selects the first set of regions from the third set of regions and causes compression of the first set of regions based on values of a first quantization parameter as determined by the MAQ unit 207. The reconciliation unit 412 also determines the second set of regions and causes compression of the second set of regions based on values of a second quantization parameter determined by the rate controller 247. Thus, the reconciliation unit 412 outputs a dynamically generated map of quantization parameters for compressing the portion 145 where some regions of the portion are processed based on the MAQ mechanism of the MAQ unit 207, and other regions of the portion are processed based on the rate control mechanism of the rate controller 247.

Mitigating the Effect of a Combination of MAQ and Rate Control:

In some embodiments, the use of a combination of the MAQ mechanism and the rate control mechanism for processing different regions of a same portion may create unexpected peaks of compression bits that can affect the overall bit rate of the stream. For example, if there is a greater section of a current portion or the entire current portion compressed according to the MAQ only, when movement starts again at corresponding regions in the successive picture of the stream there may be an impulsion of bits caused by the rate controller taking control of compression over these regions. In another example, when the stream of pictures being compressed suddenly passes from content with movement to static content (i.e., from a previous portion of picture that has motion to a current portion that is static), the MAQ may inject impulsions of bits in the encoded stream as it attempts to increase the quality of compression of the current static portion. The sudden impulsions of bits are unpredictable and may have very high amplitudes. They severely affect the rate control mechanism by reducing its efficiency and they have a direct impact on the latency.

Thus, in some embodiments, in order to avoid high variations in the bit rate of the stream and/or significant changes between the compression qualities of successive portions the reconciliation unit 412 may perform additional operations. The controller 245 is operative to configure the components of the codec 200 to operate in a Hypothetical reference decoder (HRD) low-latency mode. For example, the controller 245 is operative to configure with appropriate values the following parameters of the HRD mode: initial_cbp_removal_delay, bit_rate_scale, cpb_size_scale, bit_rate_value_minus1[0], cpb_size_value_minus1[0], cbr_flag [0], low_delay_hrd_flag. For example, "initial_cbp_removal_delay" is set to an exemplary value of 1/fps, where fps is frames per second; the "bit_rate_scale" and "bit_rate_value_minus1[0]"_represent a bit rate equivalent to 4 times the target bit rate; the "cpb_size_scale" and "cpb_size_value_minus1[0]" represent a size equivalent to target bit rate/fps; the HRD is set to operate in the low-latency mode, by having the flag "low_delay_hrd_flag" set, and in variable bit rate mode, by having the flag "cbr_flag[0]" unset.

In one embodiment, the reconciliation unit 412 includes a rate control parameter adaptation unit 404 that is operative to adapt the parameters of the rate controller 247 based on the configuration parameters for compressing the first set of static regions 142. The adapted parameters are then used by the rate controller 247 for processing portions of pictures in the codec 200. FIG. 6A illustrates a flow diagram of exemplary operations for adapting parameters of a rate controller based on the configuration parameters for compressing the first set of static regions in a picture, in accordance with some embodiments. In some embodiments, the parameters of the rate controller include a minimum quantization parameter of the rate controller 247.

At operation 604, the rate control parameter adaptation unit 404 is operative to determine whether the number of regions in the first set exceeds a first threshold. In some embodiments, the first threshold is determined dynamically based on the number of regions included in the first set and the quantization parameter associated with these regions.

When the rate control parameter adaptation unit 404 determines that the number of regions in the first set does not exceed the first threshold, the flow moves to operation 606 at which no update is performed on the rate control parameters. Alternatively, when the rate control parameter adaptation unit 404 determines that the number of regions in the first set does exceed the first threshold, the flow moves to operation 608, at which it sets a value to a minimum quantization parameter to be used by the rate control mechanism. The minimum quantization parameter is the smallest value of a QP that can be used by the rate control mechanism for processing the next portions. The operations 604-608, are performed in order to ensure that when the rate control resumes control of portions of pictures, it will only be able to increase the quality of these portions (and consequently their compression rate) up to the minimum quantization parameter determined at operation 608.

In some embodiments, the minimum quantization parameter can be set at a fixed value (e.g., 20, 15, etc.). Alternatively, the minimum quantization parameter can be determined dynamically depending on the number of static regions in the first set of regions, the quantization parameter used for compressing these regions, etc. For example, when the number of static regions in the first set is zero, the minimum quantization parameter of the rate controller is set to Min_QP1; when the first set is the entire portion, the minimum quantization parameter of the rate controller is set to Min_QP2; and when the number of static regions in the first set is a value between zero and number of regions of the entire portion, the minimum quantization parameter of the rate controller is set to Min_QP3 that is an interpolation between Min_QP1 and Min_QP2. Determining a minimum QP for compressing portions of pictures according to the rate control mechanism enables to limit the quality, at which these portions of pictures can be processed at the codec as controlled by the rate controller 247, and enable to avoid any impulsion of bits when movements start again in the stream of pictures. For example, in scenarios where there is a sudden change of a large number of regions (i.e., the number of regions exceeding the first threshold) from static to non-static (i.e., from being processed according to MAQ to being processed according to rate control), the use of the minimum QP for processing these regions (or some of the regions) limits the spike of compression bits that would otherwise affect the compression bit rate of the stream. The minimum QP of the rate controller is dynamically increased based on the number of regions that are to be compressed with the MAQ mechanism. In general, when the number of regions that are to be compressed with the MAQ mechanism increases, the minimum quantization parameter of the rate controller is also increased. Alternatively, when the number of regions that are to be compressed with the MAQ mechanism decrease, the minimum quantization parameter of the rate controller is also decreased.

Figure 6B:
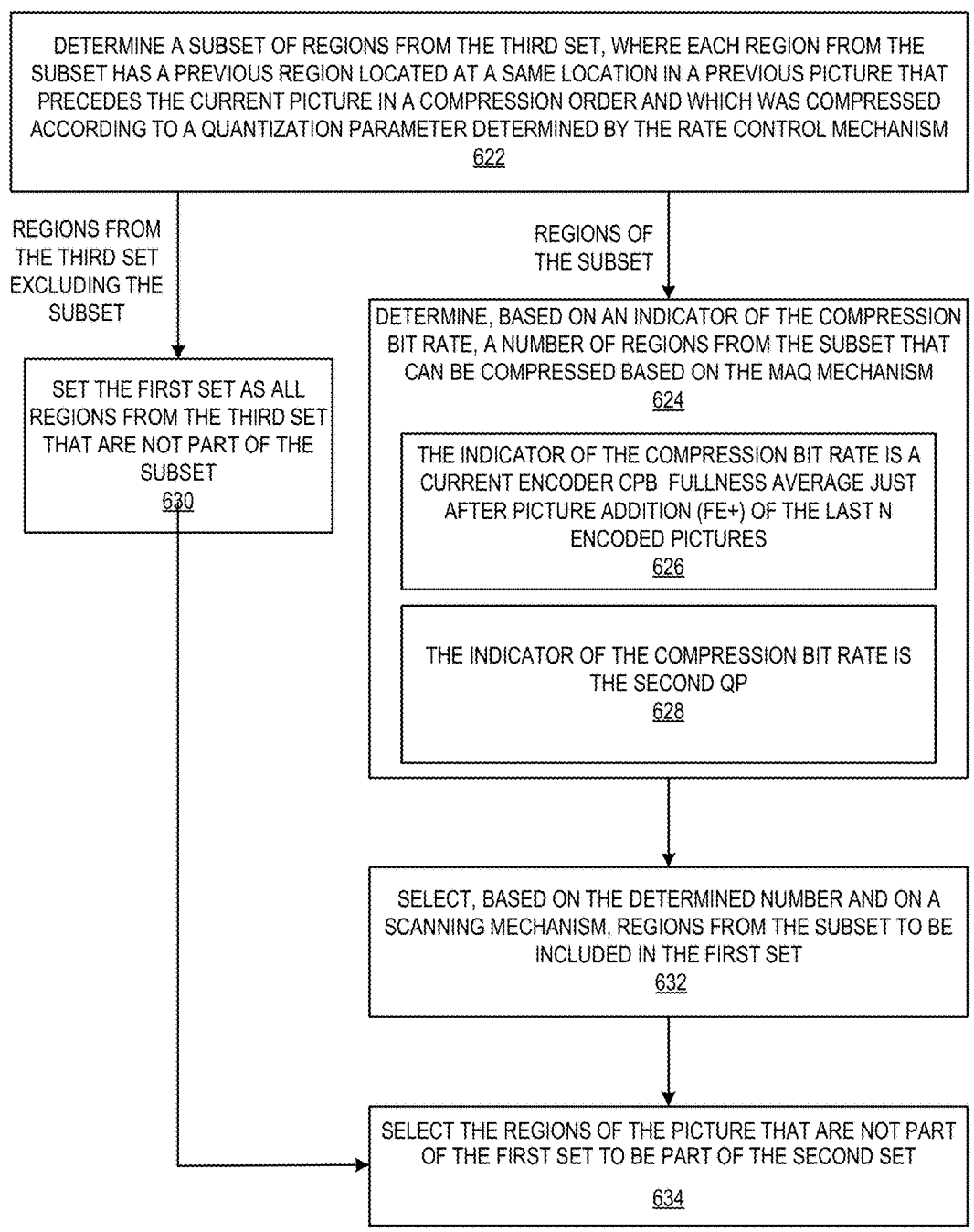
FIG. 6B illustrates a flow diagram of exemplary operations performed at the MAQ dithering unit for selecting new regions from the third set of regions, in accordance with some embodiments.

FIG. 6B illustrates a flow diagram of exemplary operations performed at the MAQ dithering unit 406 for selecting regions that are to be compressed based on the MAQ mechanism, in accordance with some embodiments. Referring back to FIG. 4, the reconciliation unit 412 includes a MAQ dithering unit 406 that is operative to perform the operations described with reference to FIG. 6B. At operation 622, the MAQ dithering unit 406 determines a subset of regions from the third set, where each region from the subset has a previous region that was compressed according to a quantization parameter determined by the rate control mechanism. The regions from the subset are referred to as new regions. The previous region is located at a same location in a previous picture as the region being processed. The previous picture precedes the current picture in a compression order.

When it is determined that there are no regions in the third set that have respective previous regions that were compressed according to a quantization parameter determined by the rate control mechanism, it is an indication that all regions of the third set (i.e., all static regions of a picture) are to be compressed based on the MAQ mechanism. The flow of operations moves to operation 630, at which the MAQ dithering unit 406 selects the first set as including all the regions of the third set. This first set is then compressed based on the MAQ mechanism.

When a subset of regions from the third set is determined, the flow moves to operations 624.

At operation 624, the MAQ dithering unit 406 determines, based on an indicator of the compression bit rate, a number of regions from the subset that can be compressed based on the MAQ mechanism. The indicator of the compression bit rate indicates how well the compression of the stream is behaving with respect to the target bit rate as set by the rate control mechanism. In one non-limiting example (as indicated at operation 628), the indicator of the compression bit rate is the second QP, where the second QP is the current base QP used for compressing portions of a picture as determined by the rate control mechanism. In another non-limiting example (as indicated at operation 626), the indicator of the compression bit rate is the encoder CPB fullness average of the last N encoded pictures just after picture additions (FE+), which is referred to herein as encoder CPB fullness average. In a non-limiting example, the last N encoded pictures can be the last 5 encoded pictures.

FIG. 7A illustrates an exemplary table of correspondence between encoder CPB fullness average threshold and a maximum number of new regions from the subset that can be compressed based on MAQ, in accordance with some embodiments. In the illustrated example, when the bit rate is below the minimum threshold (e.g., 60%), the number of new regions that can be selected to be part of the first set is set to an upper limit (e.g., a maximum of 10% of the entire picture). When the encoder CPB fullness average exceeds the maximum threshold (e.g., 80%), the number of new regions from the subset that can be selected to be part of the first set is set to a lower limit (e.g., no region in the picture can be compressed according to the MAQ mechanism, in other words, all regions of the picture are compressed based on the rate-control mechanism).

FIG. 7B illustrates an exemplary table of correspondence between the encoder CPB fullness average threshold and a maximum number of new regions from the subset that can be compressed based on MAQ, in accordance with some embodiments. Instead of a table of thresholds, where each value of a threshold is associated with a maximum number of new regions from the subset that can be selected to be in the first set, the maximum number of new regions to be improved can also be determined using an interpolation (linear, logarithmic or others) between two values (Max and Min thresholds) as illustrated in FIG. 7B.

FIG. 7C illustrates an exemplary table of correspondence between a second QP threshold and a maximum number of new regions from the subset that can be selected to be part of the first set, in accordance with some embodiments. In the illustrated example, when the second QP (i.e., the current base QP as calculated by the rate control mechanism) is below the minimum threshold (e.g., 20), the number of new regions from the subset that can be selected to be part of the first set is set to an upper limit (e.g., a maximum of 10% of the entire picture). When the second QP exceeds the maximum threshold (e.g., 40), the number of new regions that can be selected to be part of the first set is set to a lower limit (e.g., no region in the picture can be compressed according to the MAQ mechanism, in other words, all regions of the picture are compressed based on the rate-control mechanism).

FIG. 7D illustrates an exemplary table of correspondence between second threshold and a maximum number of new regions from the subset that can be selected to be part of the first set, in accordance with some embodiments. Instead of a table of QPs, where each value of a threshold corresponds with a maximum number of new regions that can be selected, the maximum number of new regions to be selected can also be determined using an interpolation (linear, logarithmic or others) between two values (Max and Min QP) as illustrated in FIG. 7D.

Referring back to FIG. 6B, flow moves from operation 624 to operation 632, at which the MAQ dithering unit 406 selects, based on the determined number and on a scanning mechanism, regions from the subset to be included in the first set.

Figure 8A:
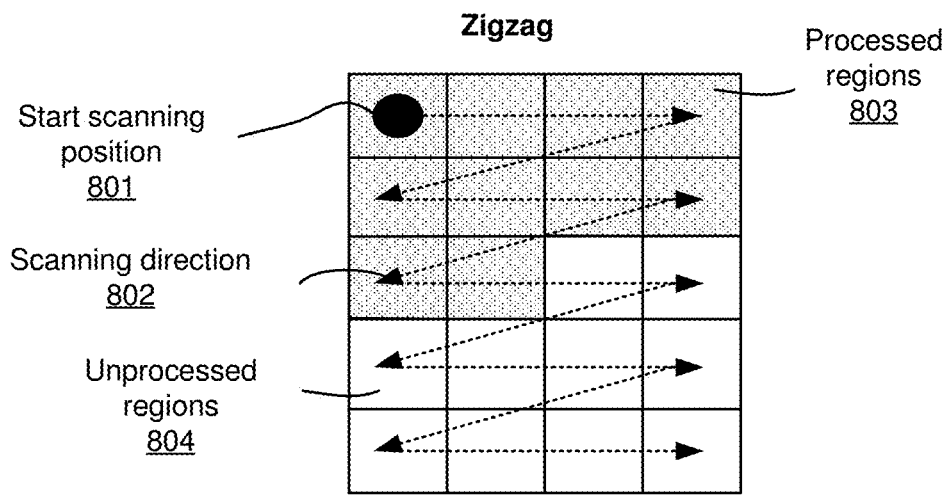
FIG. 8A illustrates an exemplary non-limiting scanning pattern for processing regions of a picture, in accordance with some embodiment.
Figure 8B:
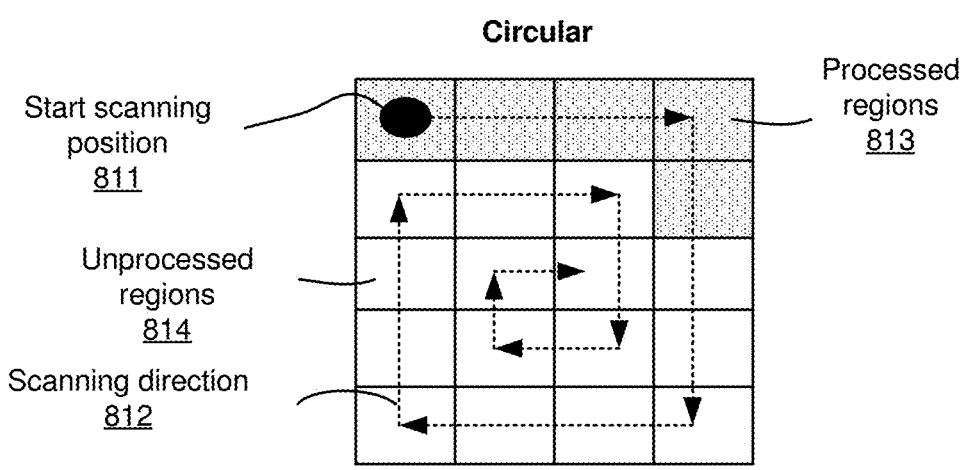
FIG. 8B illustrates an exemplary non-limiting scanning pattern for processing regions of a picture, in accordance with some embodiment.

FIGS. 8A and 8B illustrate two exemplary non-limiting scanning patterns for processing the regions of a picture, in accordance with some embodiment. These scanning patterns can be used to select the next region to process within the transformation engine 210. In these embodiments, the picture is scanned according to a scanning direction (802, 812) from a start scanning position (801 or 811) until the end of the picture. Scanning patterns of FIG. 8A or 8B can be used for determining the static regions that are to be selected from the third set of regions to be part of the first set of regions.

Referring back to FIG. 6B, once the regions to be included in the first set has been selected, flow moves to operation 634 (from operation 630 or operation 632), at which the regions of the picture that are not part of the first set are selected to be part of the second set. These regions are compressed based on the rate control mechanism.

Ultra-Low Latency Continuous Intra Refresh:

In some embodiments, to ensure that ultra-low latency is achieved, the codec is further operative to avoid the compression of an entire picture based on an intra prediction mode. The compression of a picture according to an intra-prediction mode would cause the compression bit rate to reach a peak and diverge significantly from the target bit rate. Therefore, in the embodiments of the present invention, a continuous intra refresh (CIR) mechanism is used to distribute the intra refreshing content on a plurality of pictures by compressing only a section of each picture with an intra mode, while compressing the rest of the picture with an inter prediction mode. In the description herein, this section is referred to as the intra-refresh section. The intra-refresh section is strictly smaller than the entire picture.

In some embodiments, the CIR mechanism is performed by selecting a section (e.g., a rectangle including multiple macroblocks) of a picture to be compressed based on the intra prediction mode and compressing the rest of the picture in an inter prediction mode. The selected section can be referred to as an intra section. When operating in the ultra-low latency mode, the intra section may include regions that are to be compressed based on the MAQ mechanism as well as regions that are to be compressed based on the rate control mechanism.

In these embodiments, each region from the intra section that is to be compressed based on the MAQ mechanism is caused to be compressed based on a minimum QP from a set of one or more QPs used for compressing regions based on the MAQ mechanism. The minimum QP has a value that is smaller or equal than each one of the other QPs from the set of QPs.

In some embodiments, various mechanisms can be used to determine the minimum QP for compressing an Intra-static region. For example, the MAQ unit 207 may determine for each region an associated quantization parameter from the set of quantization parameters (e.g., the step-wise progression of QPs) as well as a corresponding minimum QP value associated with this region. The minimum QP value is then stored in memory with the quantization parameter (or alternatively the corresponding improvement level) for the region. The CIR unit 408 is then operative to, based upon whether the static region is to be compressed in intra-prediction mode or in inter-prediction mode, use the minimum QP to encode the region or to use the associated QP as determined by the MAQ mechanism. In all embodiments, when a static region is determined to be in an intra-prediction mode, the transformation engine 210 processes the region according to the minimum QP associated with that region. In some embodiments, the minimum QP is different from the associated quantization parameter of the region that would have been selected by the MAQ mechanisms, from the set of QPs that change in accordance to the step-wise change from the start QP to the target QP.

Alternatively, each region from the intra section that is to be compressed based on the rate-control mechanism, is caused to be compressed based on a current base QP of the rate control mechanism and an additional negative offset. This negative offset reduces the value of the current base QP to compensate for the different compression efficiency between intra regions and inter regions. Thus, in these embodiments, the final QP obtained for processing a region of the Intra section according to the rate-control mechanism is slightly smaller than the current base QP. The current base QP is used to compress the inter regions of the current picture that are to be compressed based on the rate-control mechanism.

Adaptive CIR:

In one embodiment, the size of the intra refresh section is set to a default size. A set of parameters is used to configure the default size of the intra refresh section. For example, the intra refresh section can be a column of a rectangle within a picture of a GOP. In these examples, the section has a default width, a default length, and a default orientation. In some embodiments, the size of the intra refresh section can be varied once a refresh cycle has been completed. A refresh cycle is completed when the equivalent of an entire picture has been updated with an intra encoding, i.e., that the position of the intra refresh section has reached the bottom right of the picture.

Figure 6C:
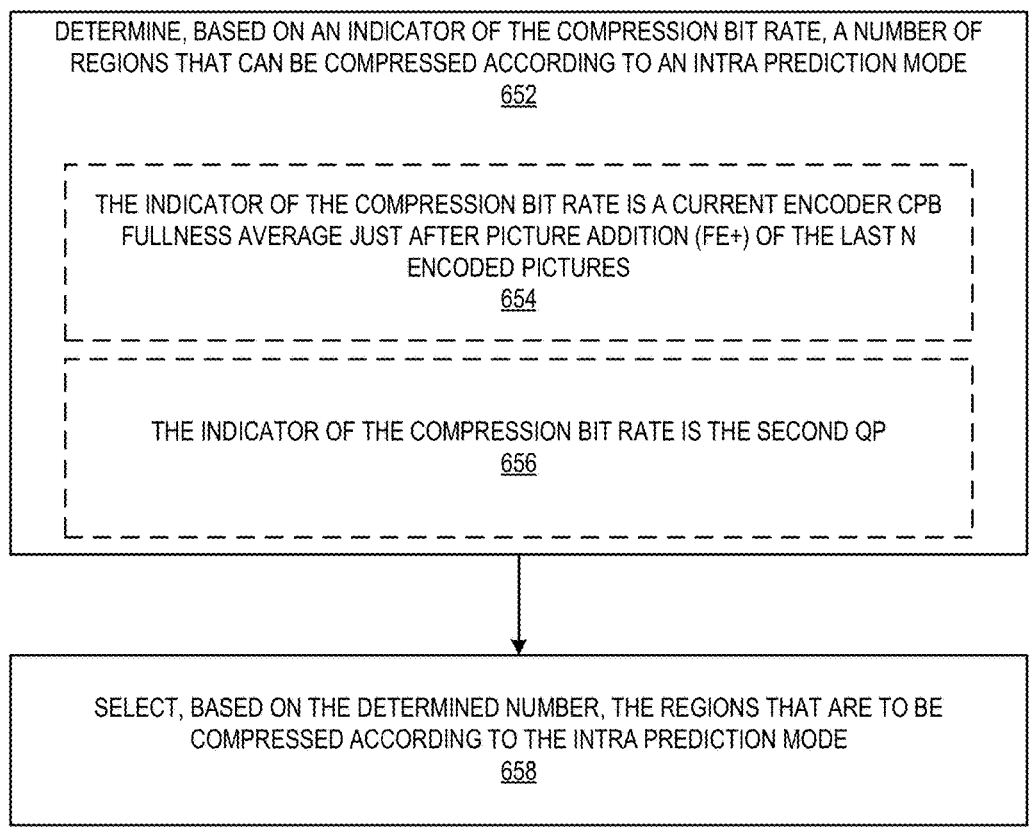
FIG. 6C illustrates a flow diagram of exemplary operations performed at the CIR unit 408 for adapting the number of regions of an intra refresh section of a current picture when the codec operates in a CIR mode, in accordance with some embodiments.

In another embodiment, the number of regions in the intra refresh section of a current picture can be dynamically adjusted from picture to the next picture. FIG. 6C illustrates a flow diagram of exemplary operations performed at the CIR unit 408 for adapting the number of regions of an intra-refresh section of a current picture when the codec operates in a low-latency mode, in accordance with some embodiments.

At operation 652 a determination of a number of regions can be compressed according to an intra prediction mode is performed based on an indicator of the compression bit rate. The indicator of the compression bit rate indicates how well the compression of the stream is behaving with respect to the target bit rate as set by the rate control mechanism. In one non-limiting example (as indicated at operation 656), the indicator of the compression bit rate is the second QP, where the second QP is the current base QP used for compressing portions of a picture as determined by the rate control mechanism. In another non-limiting example (as indicated at operation 654), the indicator of the compression bit rate is the encoder CPB fullness average of the last N encoded pictures just after picture additions (FE+), which is referred to herein as encoder CPB fullness average. In a non-limiting example, the last N encoded pictures can be the last 5 encoded pictures.

The flow moves to operation 658, at which a selection of the regions that are to be compressed according to the intra prediction mode is performed based on the determined number. For example, the CIR unit 408 causes a modification of the parameters that define the dimensions and size of the intra refresh section based on the number of regions that it includes. In one example, when the indicator of the compression bit rate is the second QP, based on the value of the second QP, the number of regions that are to be compressed in intra prediction mode changes. In this example, when the second QP increases, the number of regions that can be compressed according to the intra prediction mode decreases. The CIR unit 408 may identify a minimum intra QP threshold value (e.g., second QP min=20) and a maximum intra QP threshold value (e.g., second QP max=40). When the second QP is lower than the minimum intra QP threshold value, the number of regions that are to be compressed in intra are set to not exceed a maximum number with respect to the total number of regions in a picture (e.g., 10% of the entire picture can be compressed in intra mode). When the second QP is greater than the maximum intra QP threshold value, the number of regions that are to be compressed in intra are set to zero (e.g., no region from the entire picture can be compressed in intra mode). In some embodiments, the CIR unit 408 is operative to determine for each value of the second QP a corresponding number of regions that can be compressed in intra mode based on an interpolation.

In another non-limiting example, when the indicator of the compression bit rate is the encoder CPB fullness average of the last N encoded pictures, just after picture additions (FE+), the number of regions that are to be compressed in intra prediction mode decreases when the encoder CPB fullness average increases.

By modifying the number of regions of the intra refresh section in each picture, the number of pictures needed to complete an intra refresh cycle is modified. For example, when the size of the intra refresh section is reduced with respect to a default size, the number of pictures needed to complete the intra refresh cycle increases with respect to the default intra refresh cycle that is associated with the default size. In some embodiments, this effect can be mitigated by keeping a count of the number of regions of the intra refresh section being reduced and increasing this number when the indicator of the compression bit rate criteria changes.

Several embodiments have been described to mitigate the effect of increasing the compression quality of pictures with a MAQ mechanism, while attempting to maintain a controlled compression bit rate in a low-latency mode. Embodiments have been described where a minimum QP of the rate-control mechanism is adapted based on the number of regions that are compressed according to the MAQ mechanism. Other embodiments have been described where a number of regions to be compressed based on the MAQ mechanism are adapted based on an indicator of the compression bit rate. Other embodiments, have been described for enabling a CIR mechanism while compressing regions of a current picture based on the MAQ mechanism and simultaneously compressing portions of the current picture based on the rate-control mechanism.

In other embodiments, additional operations can be performed to mitigate the effect of the combination of the MAQ mechanism with the rate control mechanism for compressing a stream of pictures. In these embodiments, in addition to the mechanisms described above, when the codec 200 determines that the indicator of the compression bit rate does not satisfy the criteria of the target bit rate, it may issue a PSKIP (i.e., Pslice skip—which indicates that the current portion has the same content as the previous portion) for the portion of the picture that caused the criteria of the target bit rate not to be met. In some embodiments, the codec may determine to encode the current portion and all following portions up to a total size of a picture from the stream according to PSKIP. Alternatively, when the codec determines that the selection criteria is not met, it can continue processing the picture while warning the application that the selection criteria were not met and/or apply a variable frame rate.

Thus in the ultra-low latency mode, a combination of the MAQ mechanism and the rate control mechanism is used to determine a quantization parameter for processing regions of picture. This combination allows to obtain ultra-low latency display content while maintaining a superior quality of image. The embodiments of the present invention provide a superior user experience than prior art approaches. In particular, the embodiments of the present invention cause the compression of a stream of pictures to 1) converge toward a target bit rate, when compressing pictures with high movement; 2) to be under or converge toward the target bit rate when compressing pictures with some movement and some static; or 3) to be below the target bit rate with a higher quality and a lower bandwidth when compressing pictures with low movement. Further the embodiments of the present invention limit the amplitude of the bit rate variation over the specified target bit rate.

The present invention is of particular use for remote desktop applications. Given that a desktop display is static most of the time, compression of the desktop display according to the present invention, consumes much less bandwidth on the network than standard compression approaches while having a superior image quality most of the time.

Figure 9:
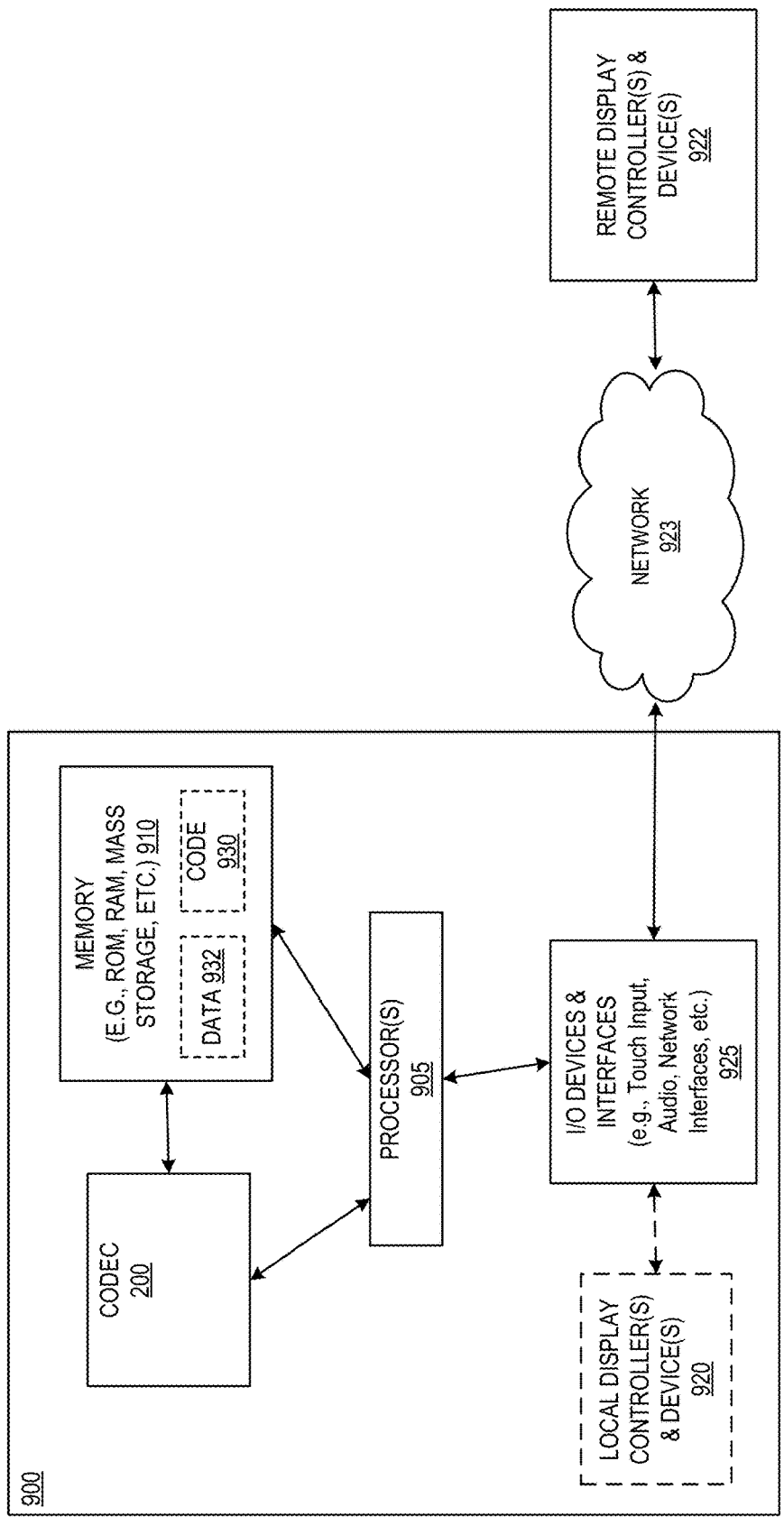
FIG. 9 illustrates a block diagram of an exemplary data processing system including a codec, in accordance with some embodiments of the invention.

FIG. 9 illustrates an exemplary data processing system including a codec in accordance with some embodiments. The data processing system 900 is an electronic device which stores and transmits (internally and/or with other electronic devices over a network) code (which is composed of software instructions and which is sometimes referred to as computer program code or a computer program) and/or data using machine-readable media (also called computer-readable media), such as machine-readable storage media 910 (e.g., magnetic disks, optical disks, read only memory (ROM), flash memory devices, phase change memory, dynamic random-access memory (DRAM)) and machine-readable transmission media (also called a carrier) (e.g., electrical, optical, radio, acoustical or other form of propagated signals—such as carrier waves, infrared signals), which is coupled to the processor(s) 905. For example, the depicted machine-readable storage media 910 may store code 930 that, when executed by the processor(s) 905, causes the data processing system 900 to request compression of image data (e.g., stored as part of data 932) from the codec 200. Thus, an electronic device (e.g., a computer) includes hardware and software, such as a set of one or more processors coupled to one or more machine-readable storage media to store code for execution on the set of processors and/or to store data. For instance, an electronic device may include non-volatile memory containing the code since the non-volatile memory can persist the code even when the electronic device is turned off, and while the electronic device is turned on that part of the code that is to be executed by the processor(s) of that electronic device is copied from the slower non-volatile memory into volatile memory (e.g., dynamic random access memory (DRAM), static random access memory (SRAM)) of that electronic device. Typical electronic devices also include a set or one or more physical network interface(s) to establish network connections (to transmit and/or receive code and/or data using propagating signals) with other electronic devices. One or more parts of an embodiment of the invention may be implemented using different combinations of software, firmware, and/or hardware.

The data processing system 900 may further include a display controller and display device 920 which provide a visual user interface for the user, e.g., GUI elements or windows. The data processing system 900 also includes one or more input or output ("I/O") devices and interfaces 925, which allows a user to provide input to, receive output from, and otherwise transfer data to and from the system. These I/O devices 925 may include a microphone, a speaker, a mouse, keypad, keyboard, a touch panel or a multi-touch input panel, camera, frame grabber, optical scanner, network interface, modem, other known I/O devices or a combination of such I/O devices. The I/O devices and interfaces 925 may also include a connector for a dock or a connector for a USB interface, FireWire, Thunderbolt, Ethernet, etc., to connect the system 900 with another device, external component, or a network. Exemplary I/O devices and interfaces 925 also include wireless transceivers, such as an IEEE 802.11 transceiver, an infrared transceiver, a Bluetooth transceiver, a wireless cellular telephony transceiver (e.g., 2G, 3G, 4G), or another wireless protocol to connect the data processing system 900 with another device, external component, or a network and receive stored instructions, data, tokens, etc. It will be appreciated that one or more buses may be used to interconnect the various components shown in FIG. 9.

For example, the interfaces may enable the system 900 to connect to a remote display controller and devices 922 through a network 923. The codec 200 of the processing system 900 is operative to compress a stream of pictures for transmission and display at the remote display devices 922.

It will be appreciated that additional components, not shown, may also be part of the system 900, and, in certain embodiments, fewer components than that shown in FIG. 9 may also be used in a data processing system 900. For example, in some embodiments the data processing system 900 may include or be coupled with an image acquisition device.

The components of the system 900 may be packaged in various manners. For example, the one or more of the processor(s) 905 and the codec 200 may be included in a System-on-a-chip (SoC). The codec 200 may be included in a chip while the central processor(s) 905 is provided externally to the chip. The memory 910 and the codec 200 may be provided in a SoC or a chip. The codec 200 may be included in an integrated circuit or a chip and the memory 910 may be external to the integrated circuit. The codec 200, the processor(s) 905 may be coupled to the memory through a memory controller (not illustrated). The codec 200 may also be located remotely from the processor(s) 905 with the two components being part of a network.

In one embodiment, a control signal may be received by the codec 200 in order to trigger compression of image data. The control signal may be generated by an application running on a processor coupled with the codec 200 (e.g., one or more processor(s) 905 of a data processing system 900). The image data to be compressed may be stored in memory 910, to an external memory coupled with the system 900 or any other memory operatively connected to codec 200, directly or indirectly. If the image data is stored externally to the system 900, it may be copied into memory 910 before processing, by the codec 200 or by a dedicated component, such as a copy engine (not shown). The application may request that an entire stream of pictures, a portion of a stream of pictures, a picture, or a portion of a picture be compressed. In some embodiments, the request for compression may be broken down into a plurality of requests for compressing portions of the stream. The control signal may comprise control information to allow the codec to configure the various components of the codec 200 with appropriate compression parameters in order to perform the requested task(s) of compressing the image data. Configuration may be performed in one or more operations, depending on the initial request and on the format of the request. Compression parameters are initialized from configuration parameters sent by the application. The configuration parameters may be provided to the codec 200 with the request for compression or separately from the request.

While the flow diagrams in the figures show a particular order of operations performed by certain embodiments of the invention, it should be understood that such order is exemplary (e.g., alternative embodiments may perform the operations in a different order, combine certain operations, overlap certain operations, etc.).

While the invention has been described in terms of several embodiments, those skilled in the art will recognize that the invention is not limited to the embodiments described, can be practiced with modification and alteration within the spirit and scope of the appended claims. The description is thus to be regarded as illustrative instead of limiting.

What is claimed is:

1. A method in a compression device of enabling low latency compression of a data stream including a plurality of pictures, the method comprising:
    determining a first set of regions of a current picture from the plurality of pictures, wherein each region from the first set of regions is static, and wherein a region is determined to be static when it is substantially identical to a previous region located at a same location in a previous picture that precedes the current picture in a compression order;
    determining a second set of regions of the current picture, wherein the second set of regions includes all regions of the current picture that are not included in the first set of regions;
    causing compression of the first set of regions based on values of a first quantization parameter (QP) determined by a motion adaptive quantization (MAQ) mechanism, wherein the MAQ mechanism is operative to dynamically increase a quality of compression of regions that are static; and
    causing compression of the second set of regions based on values of a second QP determined by a rate control mechanism, wherein the rate control mechanism is operative to compress the data stream according to a target bit rate.

2. The method of claim 1 further comprising:
    determining whether the number of regions in the first set of regions exceeds a first threshold; and
    responsive to determining that the number of regions in the first set of regions exceeds the first threshold, setting a value for a minimum QP to be used by the rate control mechanism, wherein the minimum QP is smaller than or equal to any QP from a plurality of QPs that can be used by the rate control mechanism for compressing regions of pictures.

3. The method of claim 2, wherein the first threshold is determined based on the values of the first QP used for compressing the first set of regions.

4. The method of claim 1 further comprising causing the compression device to compress the data stream based on a Hypothetical reference decoder (HRD) low latency mode.

5. The method of claim 1, wherein determining the first set of regions includes:
    determining a third set of regions from the current picture, wherein the third set of regions includes all regions of the current picture that are static; and
    selecting the first set of regions as a first subset of the third set of regions.

6. The method of claim 5, wherein selecting the first set of regions includes:
    determining a second subset of regions from the third set of regions, where each region from the second subset of regions has a previous region located at a same location in a previous picture that precedes the current picture in a compression order and which was compressed according to a respective QP that is determined by the rate control mechanism; and
    determining, based on an indicator of a compression bit rate, a number of regions from the second subset of regions that can be compressed based on the MAQ mechanism, and
    selecting, based on the determined number of regions and on a scanning mechanism, regions from the second subset of regions to be included in the first set of regions.

7. The method of claim 6, wherein determining the second set of regions of the current picture includes selecting regions of the current picture that are not part of the first set of regions to be part of the second set of regions.

8. The method of claim 6, wherein the indicator of the compression bit rate includes at least one of a current encoder Coded Picture Buffer (CPB) fullness average just after picture addition (Fe+) of the last N encoded pictures and the second QP.

9. The method of claim 1 further comprising causing the compression device to distribute intra refresh content on the plurality of pictures by performing the following:
    compressing only a section of each picture from the plurality of pictures in an intra prediction mode, wherein the section of each picture is strictly less than the entirety of each picture; and
    compressing the rest of each picture from the plurality of pictures in an inter prediction mode.

10. The method of claim 9, wherein compressing the first set of regions based on the MAQ mechanism includes:
    responsive to determining that a region from the first set of regions is included in a section of the current picture that is to be compressed in an intra prediction mode, causing compression of the region based on a minimum QP from a set of one or more QPs used for compressing regions based on the MAQ mechanism, wherein the minimum QP has a value that is smaller than or equal to each one of the other QPs from the set of QPs.

11. The method of claim 9, wherein compressing the first set of regions based on the rate control mechanism includes:
    responsive to determining that a region from the second set of regions is included in a section of the current picture that is to be compressed in an intra prediction mode, causing compression of the region based on a current base QP of the rate control mechanism in addition to a negative offset.

12. The method of claim 9 further comprising:
determining, based on an indicator of a compression bit rate, a number of regions in the current picture that can be compressed according to an intra prediction mode; and
selecting, based on the determined number of regions in the current picture, regions of the current picture that are to be compressed according to the intra prediction mode.

13. The method of claim 12, wherein the indicator of the compression bit rate is at least one of the second QP and an encoder Coded Picture Buffer (CPB) fullness average of the last N encoded pictures just after picture additions (FE+).

14. A compression device for enabling low latency compression of a data stream including a plurality of pictures, the compression device comprising:
a non-transitory computer readable storage medium to store instructions; and
one or more processors coupled with the non-transitory computer readable storage medium to process the stored instructions to:
determine a first set of regions of a current picture from the plurality of pictures, wherein each region from the first set of regions is static, and wherein a region is determined to be static when it is substantially identical to a previous region located at a same location in a previous picture that precedes the current picture in a compression order;
determine a second set of regions of the current picture, wherein the second set of regions includes all regions of the current picture that are not included in the first set of regions;
cause compression of the first set of regions based on values of a first quantization parameter (QP) determined by a motion adaptive quantization (MAQ) mechanism, wherein the MAQ mechanism is operative to dynamically increase a quality of compression of regions that are static; and
cause compression of the second set of regions based on values of a second QP determined by a rate control mechanism, wherein the rate control mechanism is operative to compress the data stream according to a target bit rate.

15. The compression device of claim 14, wherein the one or more processors are further to:
determine whether the number of regions in the first set of regions exceeds a first threshold; and
responsive to determining that the number of regions in the first set of regions exceeds the first threshold, set a value for a minimum QP to be used by the rate control mechanism, wherein the minimum QP is smaller than or equal to any QP from a plurality of QPs that can be used by the rate control mechanism for compressing regions of pictures.

16. The compression device of claim 15, wherein the first threshold is determined based on the values of the first QP used for compressing the first set of regions.

17. The compression device of claim 14, wherein the one or more processors are further to cause the compression device to compress the data stream based on a Hypothetical reference decoder (HRD) low latency mode.

18. The compression device of claim 14, wherein to determine the first set of regions includes to:
determine a third set of regions from the current picture, wherein the third set of regions includes all regions of the current picture that are static; and
select the first set of regions as a first subset of the third set of regions.

19. The compression device of claim 18, wherein to select the first set of regions includes to:
determine a second subset of regions from the third set of regions, where each region from the second subset of regions has a previous region located at a same location in a previous picture that precedes the current picture in a compression order and which was compressed according to a respective QP that is determined by the rate control mechanism; and
determine, based on an indicator of a compression bit rate, a number of regions from the second subset of regions that can be compressed based on the MAQ mechanism, and
select, based on the determined number of regions and on a scanning mechanism, regions from the second subset of regions to be included in the first set of regions.

20. The compression device of claim 19, wherein to determine the second set of regions of the current picture includes to select regions of the current picture that are not part of the first set of regions to be part of the second set of regions.

21. The compression device of claim 19, wherein the indicator of the compression bit rate includes at least one of a current encoder Coded Picture Buffer (CPB) fullness average just after picture addition (Fe+) of the last N encoded pictures and the second QP.

22. The compression device of claim 14, wherein the one or more processors are further to cause the compression device to distribute intra refresh content on the plurality of pictures by performing the following:
compressing only a section of each picture from the plurality of pictures in an intra prediction mode, wherein the section of each picture is strictly less than the entirety of each picture; and
compressing the rest of each picture from the plurality of pictures in an inter prediction mode.

23. The compression device of claim 22, wherein to compress the first set of regions based on the MAQ mechanism includes:
responsive to determining that a region from the first set of regions is included in a section of the current picture that is to be compressed in an intra prediction mode, cause compression of the region based on a minimum QP from a set of one or more QPs used for compressing regions based on the MAQ mechanism, wherein the minimum QP has a value that is smaller than or equal to each one of the other QPs from the set of QPs.

24. The compression device of claim 22, wherein to compress the first set of regions based on the rate control mechanism includes:
responsive to determining that a region from the second set of regions is included in a section of the current picture that is to be compressed in an intra prediction mode, cause compression of the region based on a current base QP of the rate control mechanism in addition to a negative offset.

25. The compression device of claim 22, wherein the one or more processors are further to:
determine, based on an indicator of a compression bit rate, a number of regions in the current picture that can be compressed according to an intra prediction mode; and
select, based on the determined number of regions in the current picture, regions of the current picture that are to be compressed according to the intra prediction mode.

26. The compression device of claim 25, wherein the indicator of the compression bit rate is at least one of the second QP and an encoder Coded Picture Buffer (CPB) fullness average of the last N encoded pictures just after picture additions (FE+).

27. A non-transitory computer readable storage medium to store instructions, which when executed by one or more processors of a compression device cause the compression device to enable low latency compression of a data stream including a plurality of pictures by performing the following operations:
   determining a first set of regions of a current picture from the plurality of pictures, wherein each region from the first set of regions is static, and wherein a region is determined to be static when it is substantially identical to a previous region located at a same location in a previous picture that precedes the current picture in a compression order;
   determining a second set of regions of the current picture, wherein the second set of regions includes all regions of the current picture that are not included in the first set of regions;
   causing compression of the first set of regions based on values of a first quantization parameter (QP) determined by a motion adaptive quantization (MAQ) mechanism, wherein the MAQ mechanism is operative to dynamically increase a quality of compression of regions that are static; and
   causing compression of the second set of regions based on values of a second QP determined by a rate control mechanism, wherein the rate control mechanism is operative to compress the data stream according to a target bit rate.

28. The non-transitory computer readable storage medium of claim 27, wherein the operations further comprise:
   determining whether the number of regions in the first set of regions exceeds a first threshold; and
   responsive to determining that the number of regions in the first set of regions exceeds the first threshold, setting a value for a minimum QP to be used by the rate control mechanism, wherein the minimum QP is smaller than or equal to any QP from a plurality of QPs that can be used by the rate control mechanism for compressing regions of pictures.

29. The non-transitory computer readable storage medium of claim 28, wherein the first threshold is determined based on the values of the first QP used for compressing the first set of regions.

30. The non-transitory computer readable storage medium of claim 27, wherein the operations further comprise:
   causing the compression device to compress the data stream based on a Hypothetical reference decoder (HRD) low latency mode.

31. The non-transitory computer readable storage medium of claim 27, wherein determining the first set of regions includes:
   determining a third set of regions from the current picture, wherein the third set of regions includes all regions of the current picture that are static; and
   selecting the first set of regions as a first subset of the third set of regions.

32. The non-transitory computer readable storage medium of claim 31, wherein selecting the first set of regions includes:
   determining a second subset of regions from the third set of regions, where each region from the second subset of regions has a previous region located at a same location in a previous picture that precedes the current picture in a compression order and which was compressed according to a respective QP that is determined by the rate control mechanism; and
   determining, based on an indicator of a compression bit rate, a number of regions from the second subset of regions that can be compressed based on the MAQ mechanism, and
   selecting, based on the determined number of regions and on a scanning mechanism, regions from the second subset of regions to be included in the first set of regions.

33. The non-transitory computer readable storage medium of claim 32, wherein determining the second set of regions of the current picture includes selecting regions of the current picture that are not part of the first set of regions to be part of the second set of regions.

34. The non-transitory computer readable storage medium of claim 32, wherein the indicator of the compression bit rate includes at least one of a current encoder Coded Picture Buffer (CPB) fullness average just after picture addition (Fe+) of the last N encoded pictures and the second QP.

35. The non-transitory computer readable storage medium of claim 27, wherein the operations further comprise causing the compression device to distribute intra refresh content on the plurality of pictures by performing the following:
   compressing only a section of each picture from the plurality of pictures in an intra prediction mode, wherein the section of each picture is strictly less than the entirety of each picture; and
   compressing the rest of each picture from the plurality of pictures in an inter prediction mode.

36. The non-transitory computer readable storage medium of claim 35, wherein compressing the first set of regions based on the MAQ mechanism includes:
   responsive to determining that a region from the first set of regions is included in a section of the current picture that is to be compressed in an intra prediction mode, causing compression of the region based on a minimum QP from a set of one or more QPs used for compressing regions based on the MAQ mechanism, wherein the minimum QP has a value that is smaller than or equal to each one of the other QPs from the set of QPs.

37. The non-transitory computer readable storage medium of claim 35, wherein compressing the first set of regions based on the rate control mechanism includes:
   responsive to determining that a region from the second set of regions is included in a section of the current picture that is to be compressed in an intra prediction mode, causing compression of the region based on a current base QP of the rate control mechanism in addition to a negative offset.

38. The non-transitory computer readable storage medium of claim 35, wherein the operations further comprise:
   determining, based on an indicator of a compression bit rate, a number of regions in the current picture that can be compressed according to an intra prediction mode; and
   selecting, based on the determined number of regions in the current picture, regions of the current picture that are to be compressed according to the intra prediction mode.

39. The non-transitory computer readable storage medium of claim 38, wherein the indicator of the compression bit rate is at least one of the second QP and an encoder Coded Picture Buffer (CPB) fullness average of the last N encoded pictures just after picture additions (FE+).

* * * * *